(12) United States Patent
Kashiwa

(10) Patent No.: US 8,244,104 B2
(45) Date of Patent: Aug. 14, 2012

(54) SYSTEM FOR CREATING CONTENT USING CONTENT PROJECT DATA

(75) Inventor: Kotaro Kashiwa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1254 days.

(21) Appl. No.: 10/602,343

(22) Filed: Jun. 23, 2003

(65) Prior Publication Data

US 2004/0004665 A1 Jan. 8, 2004

(30) Foreign Application Priority Data

Jun. 25, 2002 (JP) ................. P2002-184445

(51) Int. Cl.
*H04N 5/93* (2006.01)
(52) U.S. Cl. ........................................ 386/285; 386/278
(58) Field of Classification Search .................... None
See application file for complete search history.

(56) References Cited

U.S. PATENT DOCUMENTS

| | | | |
|---|---|---|---|
| 5,359,712 A | 10/1994 | Cohen et al. | |
| 5,889,916 A * | 3/1999 | Kimura et al. | 386/52 |
| 6,061,532 A * | 5/2000 | Bell | 396/661 |
| 6,223,190 B1 | 4/2001 | Aihara et al. | |
| 6,353,461 B1 * | 3/2002 | Shore et al. | 348/722 |
| 6,430,355 B1 | 8/2002 | Nagasawa | |
| 6,477,315 B1 | 11/2002 | Ohomori | |
| 6,546,187 B1 * | 4/2003 | Miyazaki et al. | 386/52 |
| 6,606,117 B1 * | 8/2003 | Windle | 348/239 |
| 7,020,381 B1 * | 3/2006 | Kato et al. | 386/52 |
| 7,154,534 B2 * | 12/2006 | Seki et al. | 348/207.1 |
| 2001/0040592 A1 * | 11/2001 | Foreman et al. | 345/723 |
| 2002/0168178 A1 * | 11/2002 | Rodriguez et al. | 386/92 |
| 2003/0147629 A1 * | 8/2003 | Kikuchi et al. | 386/69 |

FOREIGN PATENT DOCUMENTS

| | | |
|---|---|---|
| JP | 06 4016 | 1/1994 |
| JP | 6 243023 | 9/1994 |
| JP | 07 320457 | 12/1995 |
| JP | 8 115311 | 5/1996 |
| JP | 9 37139 | 2/1997 |
| JP | 10 066005 | 3/1998 |
| JP | 11 341350 | 12/1999 |
| JP | 2000 23080 | 1/2000 |
| JP | 2000 92419 | 3/2000 |
| JP | 2003 78868 | 3/2003 |

\* cited by examiner

*Primary Examiner* — William C Vaughn, Jr.
*Assistant Examiner* — Heather Jones
(74) *Attorney, Agent, or Firm* — Frommer Lawrence & Haug LLP; William S. Frommer; Paul A. Levy

(57) ABSTRACT

A system for creating content using content project data selects a template containing a setting of a scene arrangement of a plurality of scenes of content and creates content project data for a scene included in the selected template by setting details of the scene using existing material data or newly created data. On an imaging apparatus, a scene is selected while checking the details of the content project data on a display, and an image is captured to generate a video image signal, and the video image signal is recorded. The recorded video image signal is managed by management information for the content project data so that the video image signal is allocated to the scene arrangement of the content project data. At the time necessary scenes are shot, the content project data becomes completed content.

57 Claims, 21 Drawing Sheets

FIG. 19
(a)
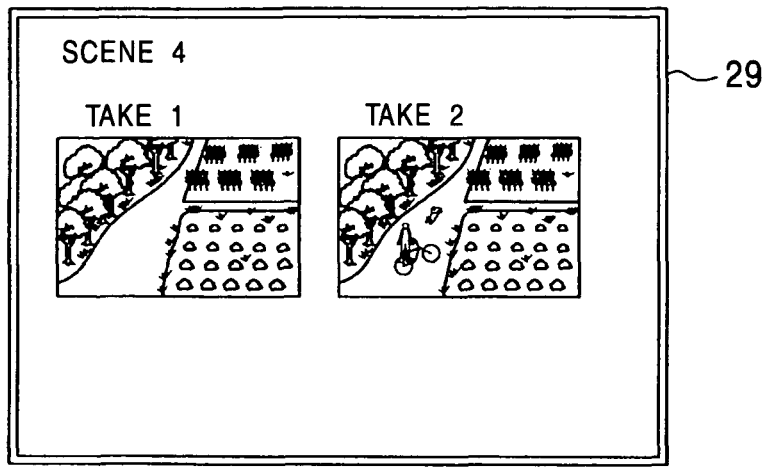
⇩ SELECT TAKE 2
(b)
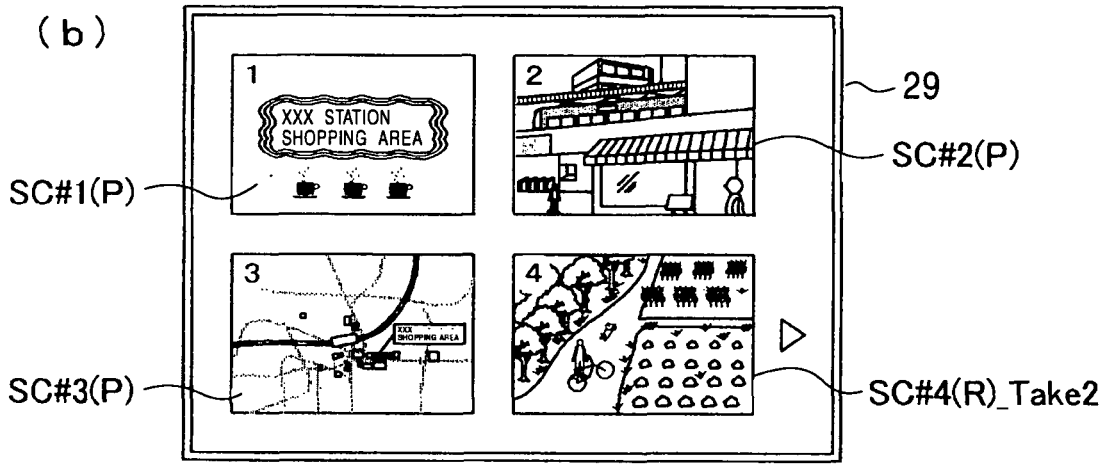
⇩ SHOOT SCENE 2
CONFIRM TAKE 1
(c)
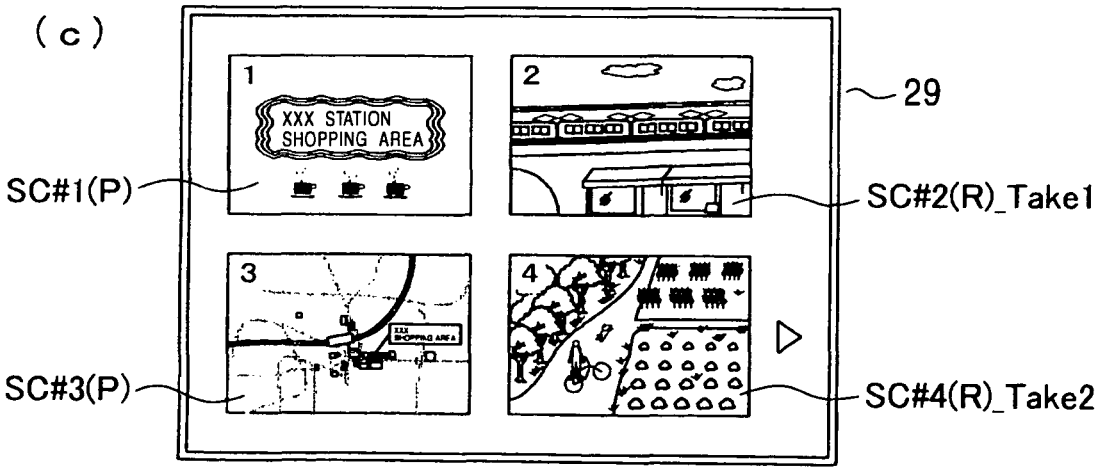

SYSTEM FOR CREATING CONTENT USING CONTENT PROJECT DATA

BACKGROUND OF THE INVENTION

1. Field of the Invention

The present invention relates to systems for creating content using content project data.

2. Description of the Related Art

Imaging apparatuses, such as portable video cameras, have been widely used for business and general domestic purposes.

The wide use of video equipment including video cameras and players has increased the chances for general users to see video content and to produce video content for fun. Also, companies, shops, local governments, educational institutions including schools, and the like have used video content more often in doing their services.

For example, such video content include a commercial or promotional video for a product, a video for introducing a local area, and an educational video. Such video content is used in making various presentations.

In the present specification, "content" or "video content" refers to one completed video title, such as the above-described commercial or promotional video, a movie, a commercial film, or a television program.

It is difficult for anyone other than a specialist, such as a video content producer, to produce content, even a simple one lasting a short time of a few minutes.

FIG. 22 shows a process of producing content.

As shown in FIG. 22, content production largely involves three steps: content project preparation, scene shooting, and editing.

In the content project preparation step, a project proposal for content to be produced is designed. Specifically, the arrangement of scenes in one piece of content, shooting locations, schedule (time and date), the details of each scene, a process of shooting each scene, and the like are planned.

In particular, the arrangement of scenes is determined by planning a sequence of the scenes, scene time, the details of images to be shot, the method of shooting each scene, and the like. Such scene arrangement planning requires the consideration of the rendition of completed content, which requires high skills and visual senses.

The details of each scene must be specified by drafting a script with drawings.

When the project including the scene arrangement and script with drawings is completed, the scene shooting step is performed. Each scene is shot on location in accordance with the details and the process specified in the project proposal.

After the necessary scenes have been shot, the video shots are edited. Specifically, the video images or the shots of the scenes are cut and pasted, and special effects including a wipe and a fade, background music, and narration are inserted. The editing work involves high skills, knowledge of editing equipment, and visual senses.

After the necessary editing is done, one piece of video content is completed.

With the content production process, video content at a level satisfactory for the above-described business purposes is created. Such content production is very difficult for anyone other than a content production specialist and requires a long period of time.

For example, this content production is not easily applicable to simple content production for services by local governments, shops, companies, and the like.

For example, when a local shopping area plans to produce an introductory video for the shopping area, when a travel agency plans to produce a sales promotion video for each travel destination, when a real-estate agency plans to produce an apartment introductory video, or the like, it is most appropriate not to ask a video content production specialist to produce such video content, but to produce it on its own by relying on its own staff. It is difficult for amateur staff having no experience in video production to produce satisfactory video content. Even when the process shown in FIG. 22 is to be done, the execution of each step is difficult. For example, it is not easy to prepare a content project while considering the final rendition of the content or to perform the efficient editing of the content after the shooting.

SUMMARY OF THE INVENTION

Accordingly, it is an object of the present invention to enable anyone other than an expert having special knowledge or skills to produce video content in a simple and efficient manner.

According to an aspect of the present invention, a content project creating method is provided including the steps of selecting a template as a template containing a setting of a scene arrangement of a plurality of scenes of content; producing scene setting data for a scene included in the template selected in the selecting step by setting details of the scene using existing material data or newly created data; and outputting content project data constructed by managing the scene setting data on the basis of the scene arrangement set in the template.

According to another aspect of the present invention, there is provided a content project creating program for causing an information processing apparatus to perform the above-described content project creating method. According to another aspect of the present invention, there is provided a program recording medium having recorded thereon such a content project creating program.

According to another aspect of the present invention, an imaging apparatus is provided including an imaging unit for capturing an image and generating a video image signal; a processing unit for processing the video image signal; an obtaining unit for obtaining content project data including scene setting data for each scene included in a scene arrangement of a plurality of scenes of content; a display control unit for displaying details of the content project data on a display device; and an imaging control unit for controlling selection of a scene of the content project data, the capturing of the image by the imaging unit, and the processing of the video image signal by the processing unit.

According to another aspect of the present invention, an imaging method is provided including the steps of obtaining content project data including scene setting data for each scene included in a scene arrangement of a plurality of scenes of content; displaying details of the content project data; and capturing an image to generate a video image signal while selecting a scene of the content project data and processing the video image signal.

According to another aspect of the present invention, there is provided an imaging program for realizing the above-described imaging apparatus and imaging method. According to another aspect of the present invention, there is provided a program recording medium having recorded thereon such an imaging program.

According to another aspect of the present invention, a content creating system is provided including a storage unit for storing a template containing a setting of a scene arrangement of a plurality of scenes of content and material data; a selecting unit for selecting the template stored in the storage unit; a scene details setting unit for producing scene setting data for a scene included in the template selected by the selecting unit by setting details of the scene using the material data obtained from the storage unit or newly created data; a content project data outputting unit for outputting content project data constructed by managing the scene setting data on the basis of the scene arrangement set in the template; an imaging unit for capturing an image and generating a video image signal; a processing unit for processing the video image signal; an obtaining unit for obtaining the content project data output by the content project data outputting unit; a display control unit for displaying details of the content project data on a display device; and an imaging control unit for controlling selection of a scene of the content project data, the capturing of the image by the imaging unit, and the processing of the video image signal by the processing unit.

According to the present invention, content project data is created on the basis of a template containing a setting of a scene arrangement. In this case, the template contains the scene arrangement including the scene structure and details serving as a guide. Even a non-expert can prepare a content project at a somewhat satisfactory level.

According to an imaging apparatus, an image is captured on the basis of content project data to generate a video image signal, and the video image signal is allocated to a scene of the content project data. Content is thus easily completed on the basis of the content project data.

BRIEF DESCRIPTION OF THE DRAWINGS

FIG. 19 includes illustrations of the operation from scene selection to shooting of this embodiment;

DESCRIPTION OF THE PREFERRED EMBODIMENTS

Figure 1:
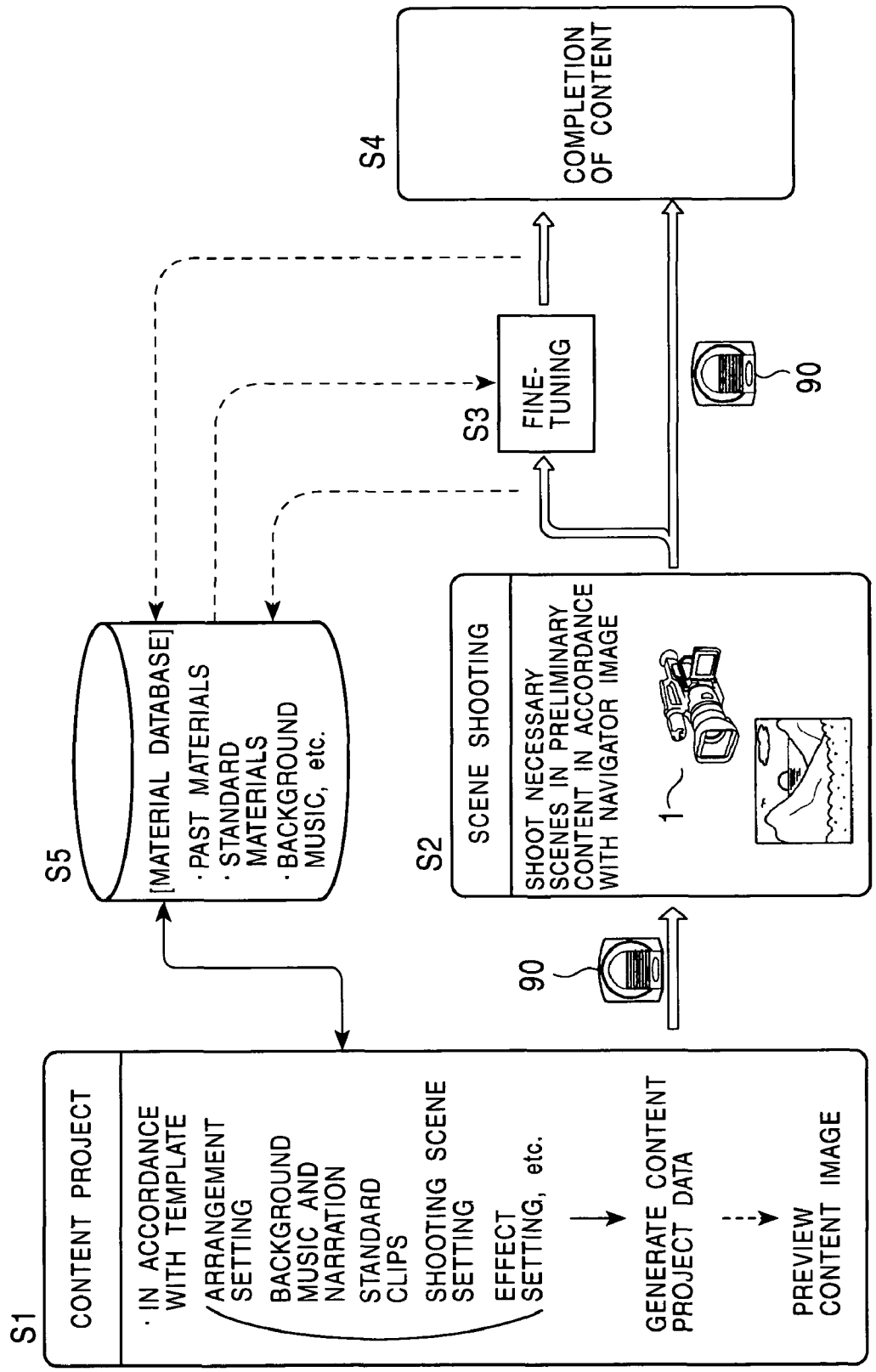
FIG. 1 is an illustration of a content production process according to an embodiment of the present invention.

Embodiments of the present invention will now be described. In the embodiments, the mechanism and operation for creating content project data by using an information processing apparatus, such as a personal computer, and the mechanism and operation for shooting video by an imaging apparatus (video camera) on the basis of the content project data and completing content will now be described.

The description is given in the following order:
1. Content Production Process
2. Content Project Preparation
   2-1 Configuration of apparatus
   2-2 Templates and material database
   2-3 Process of preparing content project
   2-4 Recording onto disk
3. Scene Shooting
   3-1 Configuration of video camera
   3-2 Process of shooting scenes
4. Modifications
1. Content Production Process Referring to FIG. 1, a content production process according to an embodiment of the present invention will now be described schematically.

The content production process of this embodiment is basically completed by preparing a content project (S1) and shooting scenes (S2), thus leading to completion of content (S4).

If necessary or in accordance with a creator's intention, fine-tuning (S3) is performed. Also, shots of scenes and the like may be accumulated in a material database (S5).

The content project (S1) is prepared by a project operator using an information processing apparatus, such as a personal computer, as a content project creating apparatus. On the personal computer, a content project creating program is activated to enable the personal computer to operate as the content project creating apparatus.

In the content project creating apparatus, a template is prepared to serve as a substantial guide including the scene arrangement, timeline, and scene details of video content. Using the template, the operator draws a content project by entering and selecting arbitrary details. An example of the template will be described later. A setting screen is prepared for each scene. For example, a template for content consisting of five scenes enables the operator to set the details of shots, timeline, and the like for each scene.

In accordance with the intended details of the content, the operator enters instructions for the details of each scene and the method of shooting each scene in the template. In the template, the operator may enter text data or simple graphic data, place a link to video data created by computer graphics, or select a still image, moving image, or standard clip that matches a desired rendition from among still images and moving images stored in the material database (S5) and place a link to the selected image. The standard clip refers to video content substantially available for general use, such as an opening video image for a plurality of pieces of content in the same series.

The operator may adjust the audio setting to insert background music or narration in accordance with the timeline included in the template or may adjust the setting to add visual effects in the scenes or at the transitions between the scenes.

After the settings in each scene have been completed on the template, the template, which has been edited in accordance with this project, becomes content project data.

The content project data corresponds to a project proposal or a script with drawings created in a content project preparation step of known content production.

The content project data is created using the template in which the scene arrangement has been set in advance. Playing the content project data enables the operator to preview the rendition of the completed content. The operator may preview the rendition of the content multiple times while drawing the content project and may refine the details of each scene.

As described above, the content project data is created by editing the template in accordance with the template in which the scene arrangement has been set to a certain degree. By playing the edited template, the operator may preview the rendition of the completed content. Therefore, even a non-expert can easily create a project.

The created content project data is stored on, for example, a disk 90. The disk 90 is recorded/played by a video camera 1 that performs scene shooting (S2).

The video camera 1 plays the content project data on, for example, an LCD (Liquid Crystal Display). A person who does the shooting (hereinafter referred to as a video shooter) checks the details of the scenes, the method of shooting the scenes, and the like serving as the content project data. Necessary images are shot in accordance with the details of the content project data. In other words, shooting, which used to be done while checking, by the operator, the project proposal or script with drawings, can now be done while checking, by the operator, the video images and the like based on the content project data.

The video images of the scenes, which are shot by the video camera 1, are recorded on the disk 90. The scene video data is allocated to the scene arrangement of the content project data and managed. In other words, a portion of setting data indicating the scene details of the content project data is replaced by the actually shot video images of the scenes. Accordingly, playing the content project data enables the actually shot image data to be played for scenes that have been shot.

In other words, at the time the necessary scenes have been shot and each piece of the video image data is linked to the content project data, the content project data becomes completed content data.

Basically, in the content project preparation step (S1) content project data is prepared; and in the scene shooting step (S2), the video camera 1 does shooting based on the content project data, thus completing one piece of content.

If necessary, fine-tuning (S3) involving, for example, audio setting, insertion of image effects, or addition, deletion, or replacement of scenes is done.

Furthermore, the video image data, modified video data, and the like may be stored in the material database as material data for use in subsequently preparing a content project (S1).

The material data stored in the material database may be used in fine-tuning (S3) to serve as part of the completed content.

The video data generated in the step of scene shooting (S2) is recorded on the disk 90 having recorded thereon the content project data in the step of preparing the content project (S1).

The recorded video data is linked to the content project data, and the overall data becomes completed content. Therefore, only one disk 90 is required to complete the content.

In this example, one disk 90 is used from the step of preparing the content project to completion of the content. Alternatively, the content project data may be recorded on another medium and transferred to the video camera 1. Alternatively, the content project data may be transferred to the video camera 1 by communication such as wired or wireless network communication. Such examples will be described as modifications later.

2. Content Project Preparation 2-1 Configuration of Apparatus

Content project preparation (S1), which is one of the steps of the content production process described with reference to FIG. 1, will now be described.

Figure 2:
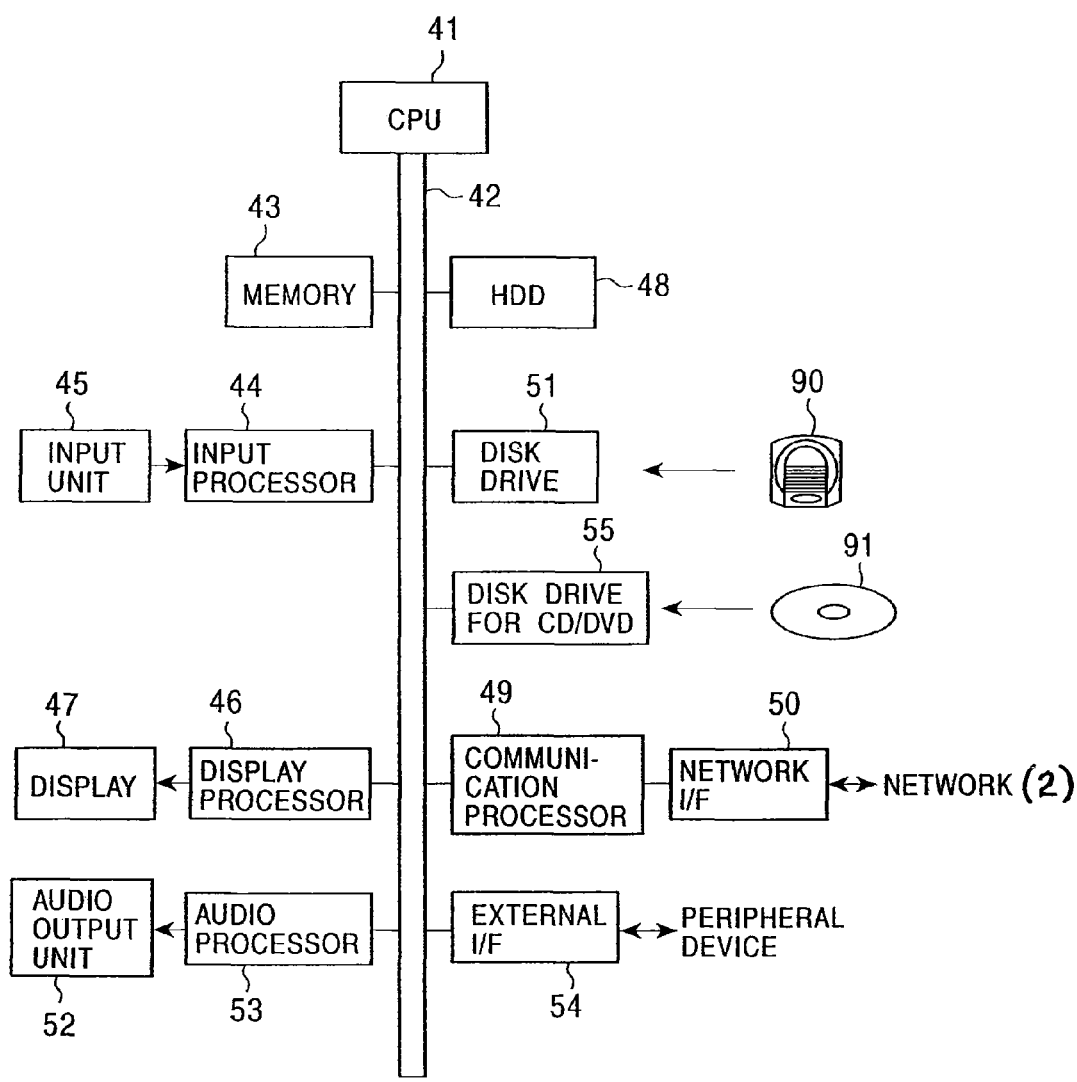
FIG. 2 is a block diagram of an information processing apparatus for creating content project data of this embodiment.

FIG. 2 shows the configuration of the content project creating apparatus. As described above, the content project creating apparatus is realized by installing the content project creating program into, for example, a personal computer and activating the content project creating program. Alternatively, a dedicated apparatus may be used instead of using a personal computer.

Referring to FIG. 2, a CPU (Central Processing Unit) 41 controls each component and performs arithmetic processing on the basis of the activated program. For example, the CPU 41 performs the input/output operation relative to the operator, memory control, HDD (Hard Disk Drive) control, network-based communication, external interface control, read/write control of disks 90 and 91, and data calculation.

The CPU 41 exchanges control signals and data with each circuit via a bus 42.

A memory 43 generally designates a RAM (Random Access Memory), ROM (Read Only Memory), flash memory, and the like used by the CPU 41 in performing operations.

The ROM of the memory 43 stores a program running on the CPU 41, a program loader, and the like. The flash memory of the memory 43 stores various arithmetic coefficients, parameters used in the program, and the like. A data area or task area for executing the program is temporarily reserved on the RAM of the memory 43.

An input unit 45 includes input devices, such as a keyboard, mouse, touch panel, remote commander, scanner, and the like. The operator preparing the content project inputs various operations and enters data. The input information is subjected to predetermined processing by an input processor 44 and transferred as operation or data input to the CPU 41. The CPU 41 performs necessary arithmetic processing or control in accordance with the input information.

A display unit 47 includes a display device, such as a CRT (Cathode Ray Tube) or LCD, and displays various pieces of information for the operator.

When the CPU 41 supplies information to be displayed (display data) in accordance with various operation states and input states to a display processor 46, the display processor 46 causes the display unit 47 to perform a display operation based on the supplied display data.

An HDD 48 stores various programs, such as the content project creating program and the like, and various data, such as the content project data and the like, and is used as a database area for the material database or the like.

Under the control of the CPU 41, a communication processor 49 encodes transmission data and decodes reception data.

A network interface 50 transmits the transmission data encoded by the communication processor 49 to an external device via a network 2. The network interface 50 transfers a signal transmitted from the external device via the network 2 to the communication processor 49.

The communication processor 49 transfers the received information to the CPU 41.

A disk drive 51 reads information from and writes information to the disk 90, which is also used as a read/write medium by the video camera 1.

Under the control of the CPU 41, the disk drive 51 records, for example, the created content project data on the placed disk 90.

A disk drive 55 reads information from and writes information to the CD-format disk 91, such as a CD-DA (Compact Disc Digital Audio), CD-ROM, or CD-R (CD Recordable), or the DVD-format disk 91, such as a DVD-ROM, DVD-RAM, or DVD-R.

For example, when an application program, such as the content project creating program, or the material database is recorded on the CD-ROM or DVD-ROM (disk 91) and supplied to the operator, the disk 91 is placed on the disk drive 55, and the program or database is installed.

Alternatively, the supplied disk 91 serving as the material database is placed on the disk drive 55. If necessary, data included in the database is read and loaded.

An external interface 54 is connected to a peripheral device in accordance with a format, such as IEEE 1394, USB, SCSI, or the like and communicates data with the peripheral device.

Devices corresponding to the disk drives 51 and 55 may be connected as peripheral devices. An external HDD may be connected, and the program or material database may be stored in the external HDD. If necessary, a printer or scanner may be connected. A LAN (Local Area Network) may be realized in conjunction with another information processing apparatus.

An audio processor 53 processes audio data to be output to the operator and supplies the processed audio data to an audio output unit 52, such as a speaker or a headphone terminal, to output the sound.

Depending on the audio processor 53 or the audio output unit 52, when audio data is read from the disks 90 and 91 by the disk drives 51 and 55, sound based on the audio data is output. An audio file or the like included in the material database stored in the HDD 48 or another component is read, and the corresponding sound is output. When the content project data is read, audio data set by the content project data is read and the corresponding sound is output.

The content project creating program may be supplied via the disk 91 or 90 to the above-described content project creating apparatus and installed, for example, in the HDD 48. Alternatively, the content project creating program may be downloaded from an external server via the network interface 50.

The content project creating program may be stored in advance in the HDD 48 or the memory 43.

Alternatively, the content project creating program may be stored in the peripheral device connected to the external interface 54.

The same applies to the material database for use in preparing the content project.

When the CPU 41 activates the content project creating program, the content project preparation (S1) described with reference to FIG. 1 is performed.

The above-described content project creating apparatus (personal computer) may perform fine-tuning (S3) shown in FIG. 1.

2-2 Templates and Material Database

The templates and material database for use in preparing the content project will now be described.

Templates may be prepared as a group of data files accompanying the content project creating program and installed in conjunction with the content project program. Alternatively, the templates may be prepared as a template data group independent of the content project creating program, and stored as data files usable by the content project creating program in the HDD 48 or the like.

Alternatively, various template data may be stored in the material database, or an independent template database may be prepared.

Figure 3:
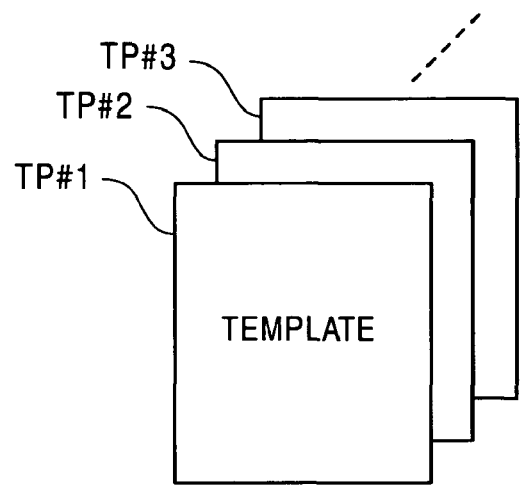
FIG. 3 is an illustration of templates for use in preparing a content project of this embodiment.

In any configuration, when the content project creating program is activated, as shown in FIG. 3, a plurality of templates TP#1, TP#2, . . . become available for use.

A template is a data file in which, for example, the more or less conventional scene arrangement of video content, timeline for each scene, and the like are set. For example, scenes from the opening title scene through the ending scene are set to serve as a guide in accordance with the story structure of the content.

The project operator only needs to set the specific details of video images of the prepared scenes. The operator may increase or decrease the number of scenes.

Figure 5:
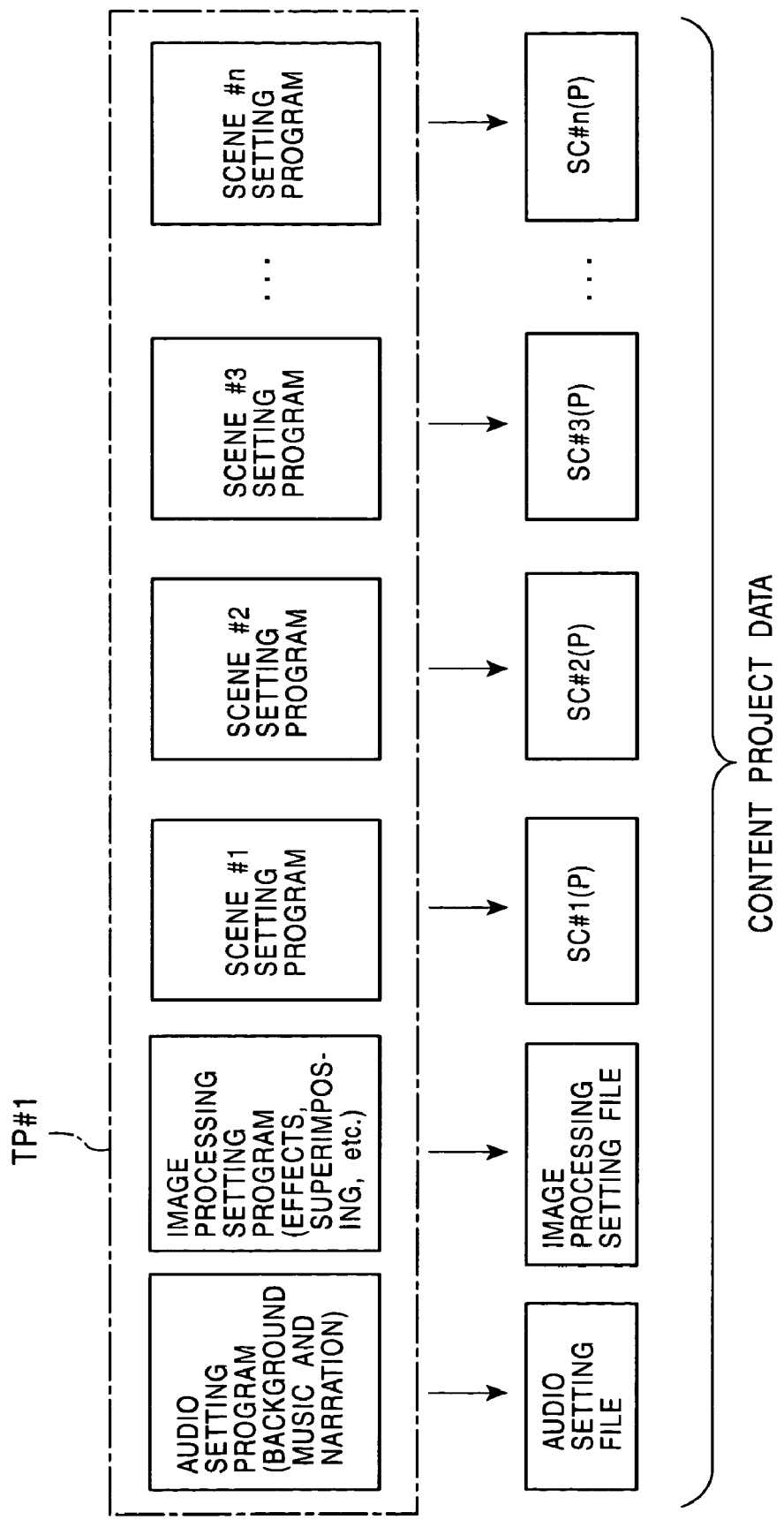
FIG. 5 is a diagram of the structure of one template of this embodiment.

For example, one template TP#1 has, as shown in FIG. 5, scene setting programs associated with pre-arranged scenes #1 to #n. On a screen displayed by each scene setting program, the operator sets the details of each scene and creates scene setting data SC#1(P) to SC#n(P).

The scene setting programs are to advance the settings of details of each scene in accordance with information input by the operator. By displaying a user interface screen and performing input-based processing, the programs implement the settings of the details of an arbitrary scene on the screen.

The template further includes an audio setting program for adjusting the audio setting including insertion of background music and/or narration. The operator sets background music or the like in accordance with the content's time base or scene and creates an audio setting file.

The template further includes an image processing setting program for setting image effects, superimposing, and the like. The operator sets image effects or the like in accordance with the content's time base or scene and creates an image processing setting file.

The audio setting program and the image processing setting program are to advance the corresponding settings in accordance with information input by the operator. By displaying the user interface screen and performing inputbased processing, the programs implement the audio setting and the image processing setting, respectively.

A set of the scene setting data SC#1(P) to SC#n(P), the audio setting file, and the image processing setting file becomes content project data to be created by preparing the content project.

In such templates, the scene arrangement may be set in a more or less general manner in accordance with the time length of content to be created. Alternatively, templates specialized for specific tasks may be prepared.

The specialized templates include a template for video content to be created by a travel agency for giving information to tourists, a template for video content to be created by a real-estate agency to introduce properties, a template for video content to be created to advertise a certain product, and the like. The specialized templates may be prepared in accordance with the details and purposes of content.

For example, the case of a "template for content for advertising and introducing a station shopping area" will be considered. The arrangement of scenes #1 to #n of the template is:

scene #1: opening title scene;
scene #2: scene of landscape of the station area;
scene #3: scene for introducing a map;
scene #4: scene for introducing townscape; and
scene #5: ending scene.

In accordance with the details specialized to a certain extent, scene setting programs are prepared. Each scene's standard time is set.

The project operator is only required to edit the template on the basis of the project principle while viewing the guide-like standard details prepared by each scene setting program.

In preparation of the content project using the template, various data prepared in the material database can be used.

Figure 4:
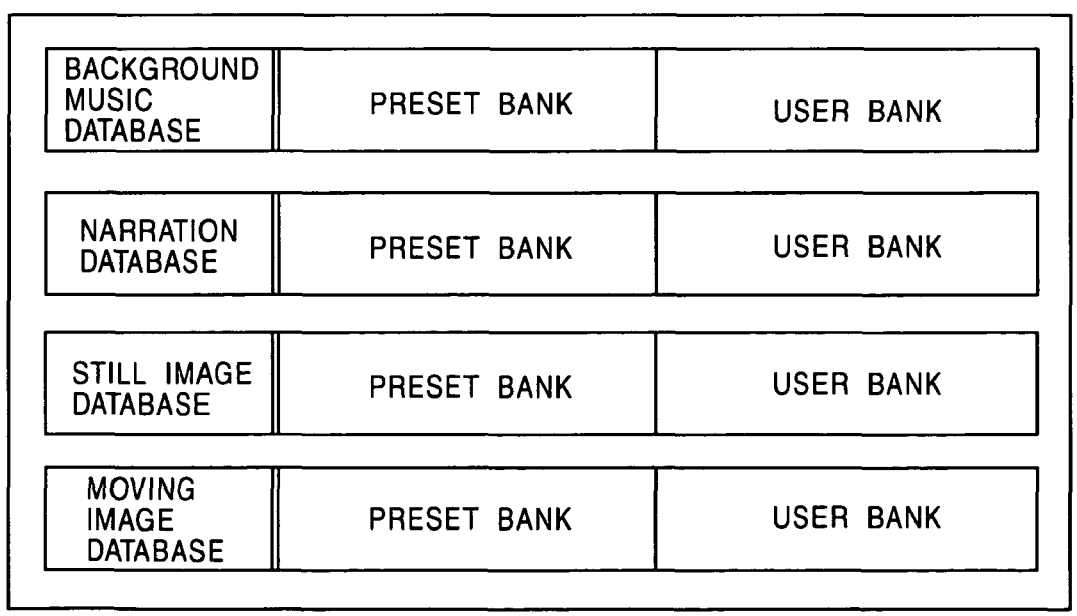
FIG. 4 is a diagram of a material database for use in preparing the content project of this embodiment.

The material database contains, for example, as shown in FIG. 4, a background music database, a narration database, a still image database, a moving image database, and the like. Each of the databases contains data serving as a preset bank that is prepared in advance and data serving as a user bank that is registered by a user.

For example, the background music database contains various music data prepared as the preset bank. In addition, the user may register the user's favorite songs as music data in the user bank.

When setting background music on the basis of the template's audio setting program, the user may select and set music data serving as background music from the background music database.

The same applies to the case of setting narration voice. Most narration voices other than general ones must be produced in accordance with the details of content. By having narration voices recorded and registered in the user bank, narration to use in the actual completed content can be selected when preparing the content project.

In the still image database and the moving image database, various video data are prepared as the preset banks. In addition, the user may register part of content that has been produced by the user in the past, video image data, or data created by computer graphics in the user banks.

When advancing the scene setting operation on the basis of the scene setting program, the user may select video data similar to the details of the scene from the database and apply the selected video data to the details of the scene. Alternatively, the user may apply video data to be actually used in completed content to the details of the scene.

2-3 Process of Preparing Content Project

Using a specific example, a process of preparing a content project, which is performed on the basis of the content project creating program using the above-described templates and the material database, will now be described.

When creation of content project data starts in response to activation of the content project creating program by the CPU 41, in step F101, the template selection processing is performed.

The CPU 41 displays a template selection screen on the display unit 47 and requests the operator to select a template. For example, a list of templates is displayed on the screen.

There are prepared various types of templates, ranging from those with the more or less standard scene arrangement to those that are specialized for content production in specific operation fields. The operator uses the input unit 45 to select a template that is most suitable for this content production from among the prepared templates.

When the template is selected, in step F102, scene setting data, an audio setting file, and an image processing setting file are created on the basis of the template.

For example, in step F102, the CPU 41 displays on a processing selection screen a menu including the scene setting of scenes #1 to #n included in the scene arrangement of the selected template, the audio setting, and the image processing setting and prompts the operator to select the type of setting. In response, the operator arbitrarily selects the type of setting.

When the operator selects to set the audio setting, the processing by the CPU 41 based on the content project creating program proceeds to step F103. In step F103, an operation screen based on the audio setting program of the template is displayed to prompt the operator to set the audio setting such as insertion of background music or the like.

When the operator selects to set the image processing setting, the processing by the CPU 41 based on the content project creating program proceeds to step F104. In step F104, an operation screen based on the image processing setting program of the template is displayed to prompt the operator to set the image processing setting, such as addition of image effects including a wipe, superimposing, or the like.

When the operator selects to set the scene setting, the processing by the CPU 41 based on the content project creating program proceeds to step F105. In step F105, the CPU 41 selects to set the scene setting.

For example, a processing selection screen having a menu containing scenes #1 to #n and the scene arrangement editing operation is displayed to prompt the operator to select which scene to set. In response, the operator selects the scene or selects the scene arrangement editing operation.

When the operator selects scene #1, in step F106-1, an operation screen based on the scene #1 setting program of the template is displayed to prompt the operator to set the details, time, and the like of scene #1. When the operator selects scenes #2 to #n, the operator performs the similar processing in the corresponding steps F106-2 to F106-n.

Depending on the content project to be created, the scene arrangement of the selected template may have an insufficient number of scenes or an excess number of scenes. In such a case, the operator selects the scene arrangement editing operation. In step F107, the CPU 41 displays a scene arrangement editing screen on the display unit 47 to prompt the operator to edit the scenes. In accordance with information input by the operator, for example, a scene is added and inserted into the scene arrangement set in the template, or a scene is deleted from the scene arrangement set in the template.

In step F108, it is determined whether or not the scene setting is completed. In other words, after the scene setting is completed in one of steps F106-1 to F106-n or the scene arrangement editing is completed in step F107, in step F108, the CPU 41 displays on the display unit 47 a message asking the operator whether to continue setting the scene setting and prompts the operator to input information.

When the operator wants to proceed to the subsequent scene setting, the operator inputs information indicating that the user wants to continue. In response, the process returns to step F105, and the operator arbitrarily selects to set the settings of scene #1 to #n or selects to edit the scene arrangement and performs a desired operation.

When the operator instructs in step F108 to terminate the scene setting, in step F109, the review processing of the template (content project data created by editing the template) is performed. Specifically, when the operator requests a review, the CPU 41 reads the edited template at that time. In other words, the display unit 47 and the audio output unit 52 output video images and sounds based on the set details. The user is thus enabled to check the current state of the template.

During or after the review of the template, the CPU 41 displays a message asking the operator to confirm the current template as content project data.

When the operator wants to continue editing the template, in step F110, the operator selects to continue the processing (the operator does not confirm the current template as content project data since the current template is not complete as content project data). In response, the process returns to step F102, and the operator selects an arbitrary operation in a manner similar to the above and performs the arbitrary operation.

Figure 6:
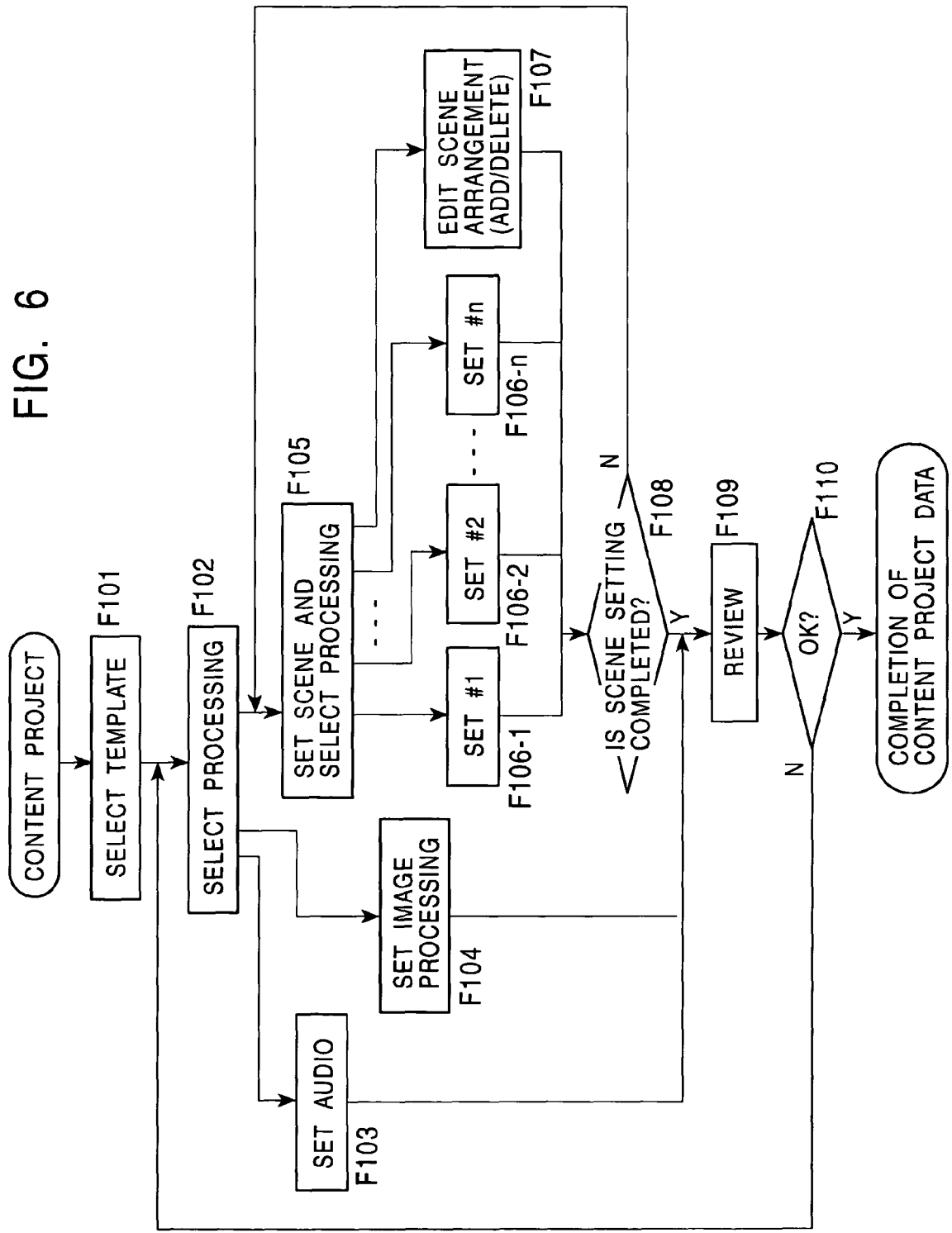
FIG. 6 is a flowchart showing a process of preparing the content project of this embodiment.

When the review is done at a particular time and the operator confirms the template at that time as content project data, in step F110, the operator inputs an affirmative instruction in step F110. At this time, the process shown in FIG. 6 is completed. In other words, the edited template at that time is completed as a piece of content project data.

By advancing the content project preparation on the basis of the content project creating program for performing the above-described process, the operator sets the details in an arbitrary order while arbitrarily reviewing the editing state of the template. The operator can repeatedly adjust the settings until the operator becomes satisfied with the settings of the details. Anyone other than an expert can create content project data in a very simple and flexible manner while checking the rendition of completed content. Since the quality of content project data (quality of completed content) is easily estimated by reviewing the template, content project data based on which high-level content can be created is generated.

Figure 7:
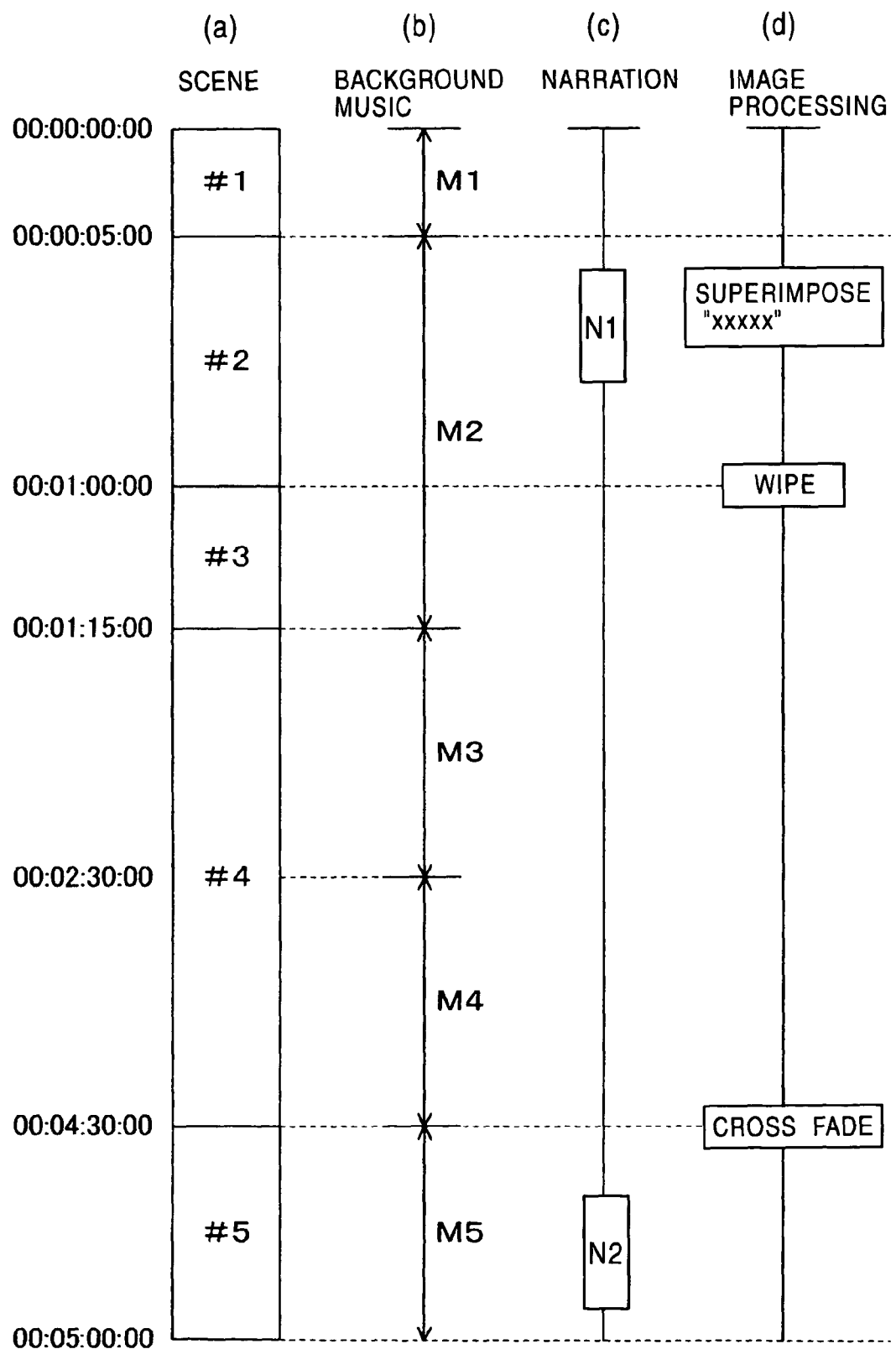
FIG. 7 is a chart describing audio setting and image processing setting performed in preparing the content project of this embodiment.

Referring to FIG. 7, the audio setting done in step F103 and the image processing setting done in step F104 of the content project preparation process will be described.

Referring to FIG. 7(*a*), the currently selected template is for content scheduled to last five minutes from 00:00:00:00 to 00:05:00:00 (time code contains hour: minute: second: frame), and the scene arrangement is scheduled to have five scenes #1 to #5.

For example, the timeline for each scene is set in advance in this template as follows: scene #1 lasts 5 seconds, scene #2 lasts 55 seconds, scene #3 lasts 15 seconds, scene #4 lasts 3 minutes and 15 seconds, and scene #5 lasts 30 seconds.

In this case, the overall content is a video stream lasting five minutes. In step F103, the audio setting is adjusted to insert background music and/or narration voice on the time base or in accordance with the scene.

FIG. 7(*b*) shows an example of setting background music.

For example, the operator selects music data M1 as background music for scene #1. Accordingly, music data M1 is set as background music lasting 5 seconds from 00:00:00:00 to 00:00:05:00.

For scenes #2 and #3, the operator selects music data M2. Accordingly, music data M2 is set as background music lasting 1 minute and 10 seconds from 00:00:05:00 to 00:01:15:00.

Alternatively, the operator may set background music by specifying not the scene, but the time code. For example, when the operator specifies the time code from 00:01:15:00 to 00:02:30:00 and selects music data M3, music data M3 is set as background music for the first half of scene #4.

Similarly, when the operator specifies the time code from 00:02:30:01 to 00:04:30:00 and selects music data M4, music data M4 is set as background music for the last half of scene #4.

For example, as described above, music data selected by the operator is set as background music in accordance with the time code on the time base or the scene.

Music data may be selected by selecting a desired piece of music from the material database. Alternatively, instead of using the material database, music data recorded by the operator and stored in a data file in the HDD 48 or music data ripped from the disk 91 or the like may be selected.

FIG. 7(*c*) shows an example of setting narration.

In this case, the operator selects voice data serving as narration voice in accordance with the scene or time code. Accordingly, narration voice data selected in accordance with the scene or time code is set. Referring to FIG. 7(*c*), narration voice data N1 is set in accordance with scene #2. Also, narration voice data N2 is set in accordance with a particular time code point in scene #5.

Narration voice data may be selected from the material database. Alternatively, instead of using the material database, narration voice data recorded by the operator and stored in a data file in the HDD 48 may be selected.

In step F103, the CPU 41 sets audio data, as shown in FIGS. 7(*b*) and (*c*), in accordance with the selection and setting by the operator. Specifically, the CPU 41 creates an audio setting file including the actual audio data in accordance with the scene or time code.

Similarly, in step F104, the image processing setting is set in accordance with the scene or time code.

For example, when the operator wants to superimpose text on scene #2, the operator inputs characters to be superimposed and specifies the time at which the characters are displayed using the scene or time code.

When the user wants to set visual effects such as a wipe or a cross fade, the operator specifies the type of visual effects and the effect time using the scene, time code, or the transition between the scenes.

In accordance with these operations, as shown in FIG. 7(*d*), the image processing setting is done on the time base of the content. For example, the settings are done to superimpose the characters at the beginning of scene #2, to perform a wipe at the transition between scenes #2 and #3, and to perform a cross fade at the transition between scenes #4 and #5.

In step F104, the CPU 41 creates an image processing setting file including the details of the image processing setting instructed by the operator.

In the template, the scene arrangement (the number of scenes and the order of scenes), the timeline for each scene, and the like can be changed by the scene setting processing (F106-1 to F106-n and F107).

For example, subsequent to adjusting the audio setting or the image processing setting, when the timeline for each scene is changed by the scene setting, it is preferable that data (time code or scene number) specifying a period for which background music or narration is output or the like be corrected automatically in the audio setting file or the image processing setting file in accordance with the change in the timeline or the like.

For example, in the case of background music, as shown in FIG. 7(*b*), music data M1 associated with scene #1 is set as music data to be played for 5 seconds. When the period of scene #1 is changed to 10 seconds, the time for which music data M1 is played is automatically corrected to 10 seconds. In other words, the play end point is corrected to the time code 00:00:10:00.

When such a change is made, the time codes corresponding to the transitions between the subsequent scenes are shifted. In accordance with the shift, automatic correction is carried out.

With reference to FIGS. 8A to 12, an example of setting scenes in steps F106-1 to F106-n will now be described.

As illustrated in FIG. 7(a), when a selected template consists of five scenes #1 to #5, the template has scene setting programs, such as those shown in FIG. 5, associated with scenes #1 to #5.

The template is prepared for, for example, local introductory content introducing a station shopping area.

For example, in the template, setting screens for scenes #1, #2, #3, #4, and #5 are prepared as the scene setting programs associated with scenes #1 to #5.

When the template is prepared for, for example, local introductory content for introducing the station shopping area, as described above, the scene setting screens are set in advance as the opening title scene, the station area landscape scene, the map introducing scene, the townscape introducing scene, and the ending scene.

Examples of the setting screens for scenes #1, #2, #3, and #4 are shown in FIGS. 8A, 9A, 10A, and 11A, respectively.

Each of the setting screens includes, for example, a video setting area 100 for setting the details of video images, a scene description area 101 for describing the details of each scene, a timeline area 102 for setting the timeline for each scene, and a shooting method area 103 for setting the method of shooting each scene.

In the video setting area 100, video images of the scene and descriptions of the video images are displayed, or video data to be actually used as completed content is displayed.

In the shooting method area 103, information instructing the method of shooting images with the video camera 1 is written.

For example, when the operator selects scene #1 in step F105, the screen is displayed and the input-based processing is performed on the basis of the scene #1 setting program included in the template.

Figure 8B:
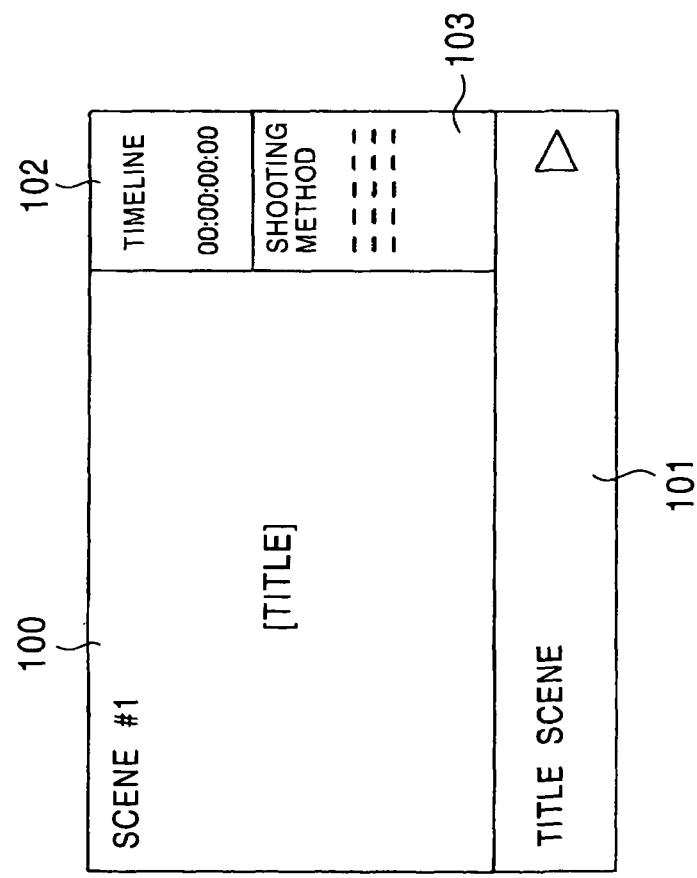
FIGS. 8A and 8B are illustrations of generation of scene setting data based on the template of this embodiment.
Figure 8A:
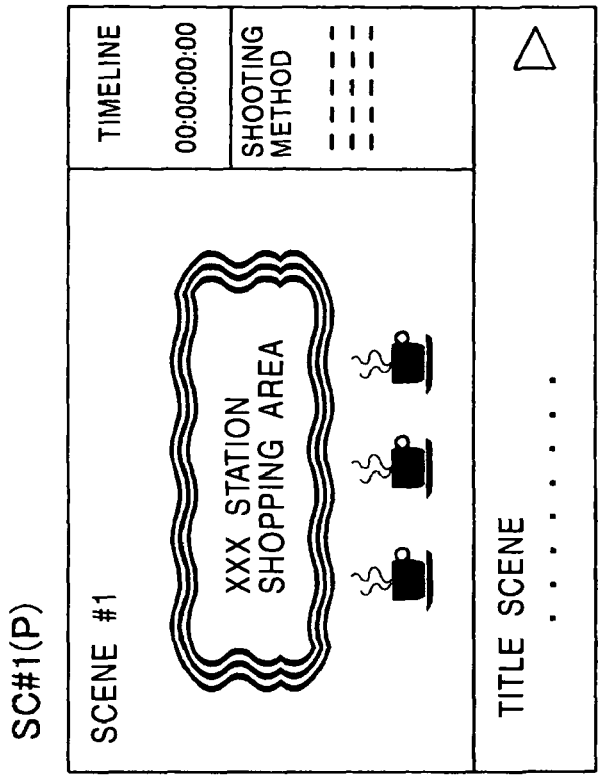

The CPU 41 displays a setting screen for the title scene, such as that shown in FIG. 8A, on the display unit 47. The setting screen indicates that it is to set, for example, the title scene in the scene description area 101 and indicates the time length of the scene in the timeline area 102.

In the video setting area 100, a message prompting the operator to input a title video image is displayed.

The operator operates the input unit 45 and inputs various pieces of information to the above-described setting screen. For example, the operator inputs title characters and selects the background. The background may be selected by selecting a still image or a moving image from the material database or image data created or input by the operator.

With the above-described operations, scene setting data SC#1(P) for scene #1, which is shown in FIG. 8B, is generated.

The shooting method or timeline can be changed.

When the title scene in which the title characters and the background have been set is to be used, unchanged, as completed content, the message "unnecessary to shoot images" or the like may be input in the shooting method area 103.

The CPU 41 stores the scene setting data SC#1(P) created by inputting information to and editing the information on the setting screen included in the template.

Figure 9A:
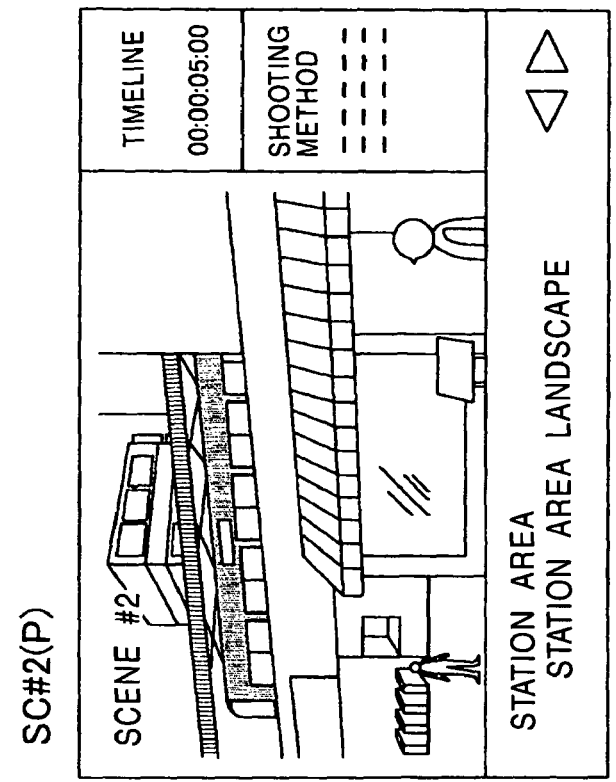
FIGS. 9A and 9B are illustrations of generation of scene setting data based on the template of this embodiment.

When the operator selects scene #2 in step F105, on the basis of the scene #2 setting program included in the template, the CPU 41 displays a setting screen for the station area landscape scene, such as that shown in FIG. 9A, on the display unit 47. The setting screen indicates that it is to set, for example, the station area landscape scene in the scene description area 101 and indicates the time length of the scene in the timeline area 102. Although nothing is displayed in the video setting area 100, a guide-like image may be set in the video setting area 100.

The operator sets the details of video images, the timeline, and the shooting method on the above-described setting screen. If the operator thinks that the station area scene is unnecessary, the operator may change the scene description and perform various settings.

When setting the details of video images serving as the station area scene, the operator inputs characters, such as "scene of a train departing from the station", indicating the details as text data in the video setting area 100 or creates a scene of a train departing from the station by computer graphics and places a link to the video data. Alternatively, a moving image or a still image similar to such a scene may be selected from the material database, and a link may be placed to the selected image.

When the operator wants to specify the shooting method or to change the timeline, the operator inputs information instructing to specify the shooting method or to change the timeline.

Figure 9B:
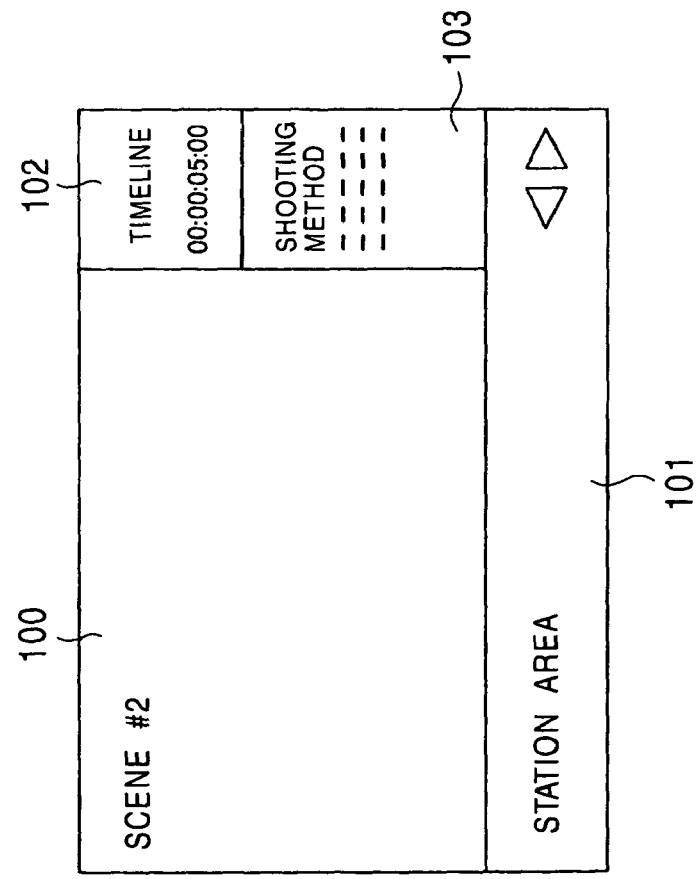

With the above-described operations, for scene #2, scene setting data SC#2(P) in which the video setting is set as shown in FIG. 9B is generated. The CPU 41 stores the scene setting data SC#2(P) created by inputting information to and editing the information on the setting screen included in the template.

Figure 10B:
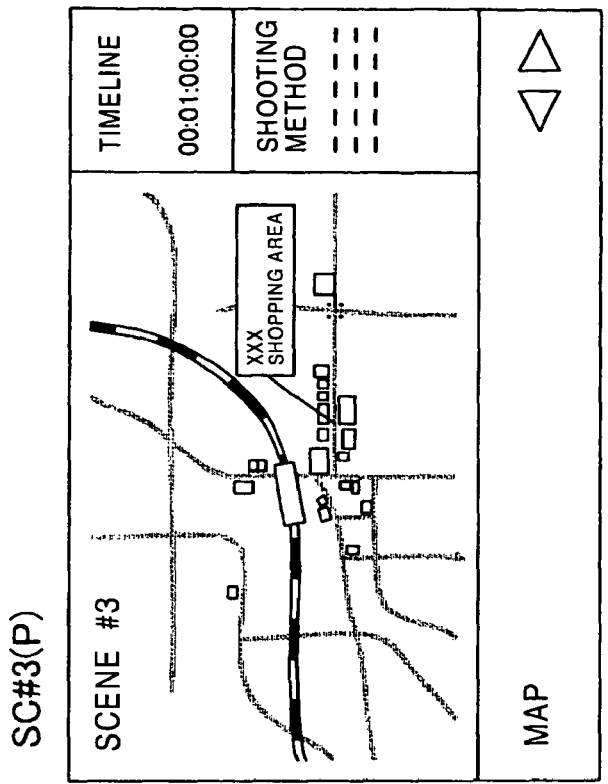
FIGS. 10A and 10B are illustrations of generation of scene setting data based on the template of this embodiment.
Figure 10A:
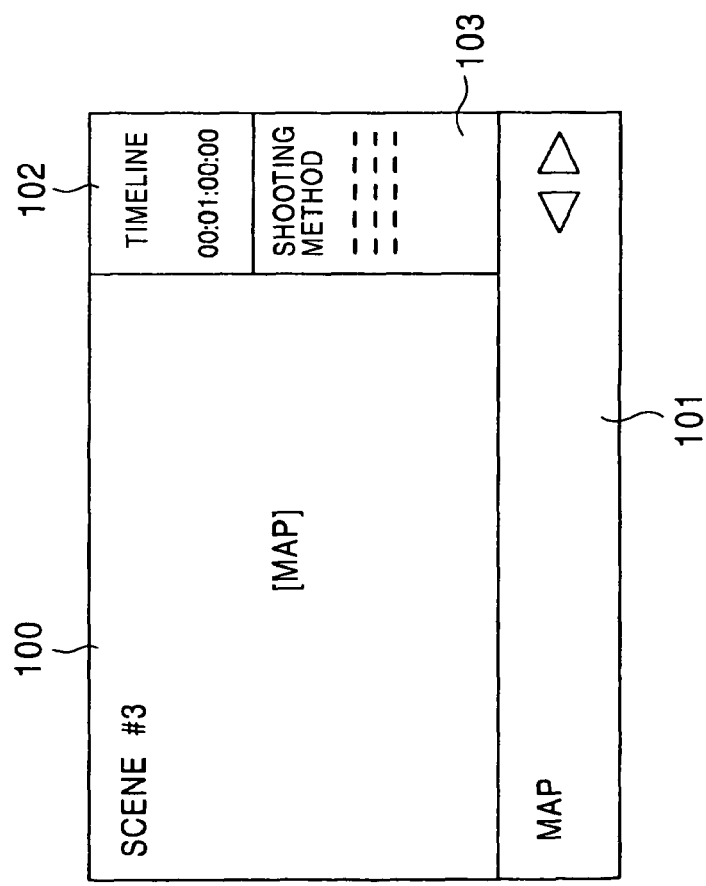

When the operator selects scene #3 in step F105, on the basis of the scene #3 setting program included in the template, the CPU 41 displays a setting screen for a station area map, such as that shown in FIG. 10A, on the display unit 47. The setting screen indicates that it is to display, for example, the map in the scene description area 101 and indicates the time length of the scene in the timeline area 102. In the video setting area 100, a message prompting the operator to input a map image is displayed.

The operator sets the details of video images, the timeline, and the shooting method on the above-described setting screen. If the operator thinks that the map scene is unnecessary, the operator may change the scene description and perform various settings.

When setting the details of a video image serving as the map scene, the operator places a link to a map image in the video setting area 100. For example, the operator selects a still image of a map image of this area from the material database and places a link to the selected still image. Alternatively, the operator may create map image data by computer graphics or may obtain map image data using a scanner or the like and may place a link to the map image data.

The operator may input, for example, "unnecessary to shoot images" instead of the shooting method or may change the timeline if the operator wants to change the timeline.

With the above-described operations, for scene #3, scene setting data SC#3(P) in which the video setting is set as shown in FIG. 10B is generated. The CPU 41 stores the scene setting data SC#3(P) created by inputting information to and editing the information on the setting screen included in the template.

Figures 11A, 11B:
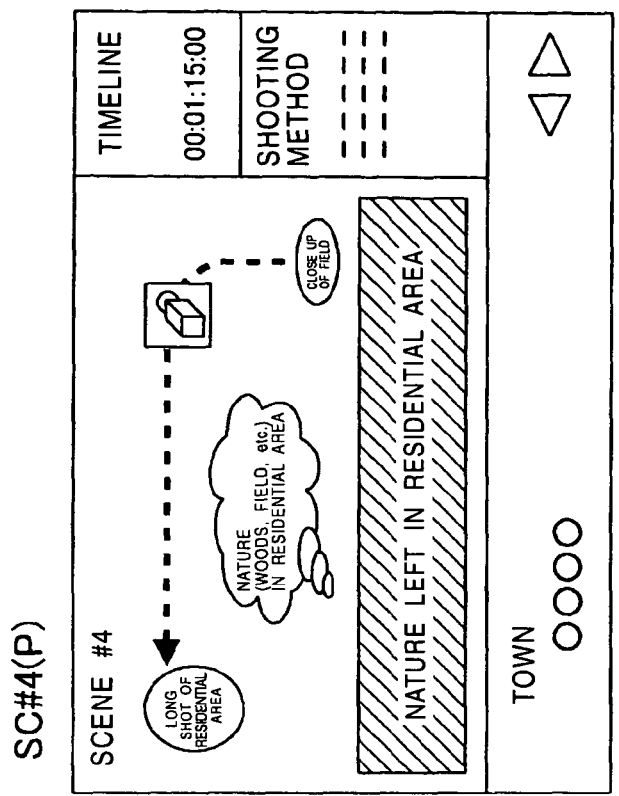
FIGS. 11A and 11B are illustrations of generation of scene setting data based on the template of this embodiment.

When the operator selects scene #4 in step F105, on the basis of the scene #4 setting program included in the template, the CPU 41 displays a setting screen for the townscape scene, such as that shown in FIG. 11A, on the display unit 47. The setting screen indicates that it is to set, for example, the townscape scene in the scene description area 101 and indicates the time length of the scene in the timeline area 102. Although nothing is displayed in the video setting area 100, a guide-like image may be set in the video setting area 100.

The operator sets the video content, the timeline, and the shooting method on the above-described setting screen. If the operator thinks that the townscape scene is unnecessary, the operator may change the scene description and perform various settings.

When setting the video content serving as the townscape scene, the operator inputs characters indicating the content, which serve as text data, in the video setting area 100 or places a link on video data created by computer graphics or video data selected from the material database. When the operator wants to specify the shooting method or to change the timeline, the operator inputs information instructing to specify the shooting method or to change the timeline.

With the above-described operations, for scene #4, scene setting data SC#4(P) in which the video setting is set as shown in FIG. 11B is generated. The CPU 41 stores the scene setting data SC#4(P) created by inputting information to and editing the information on the setting screen included in the template.

Figure 12:
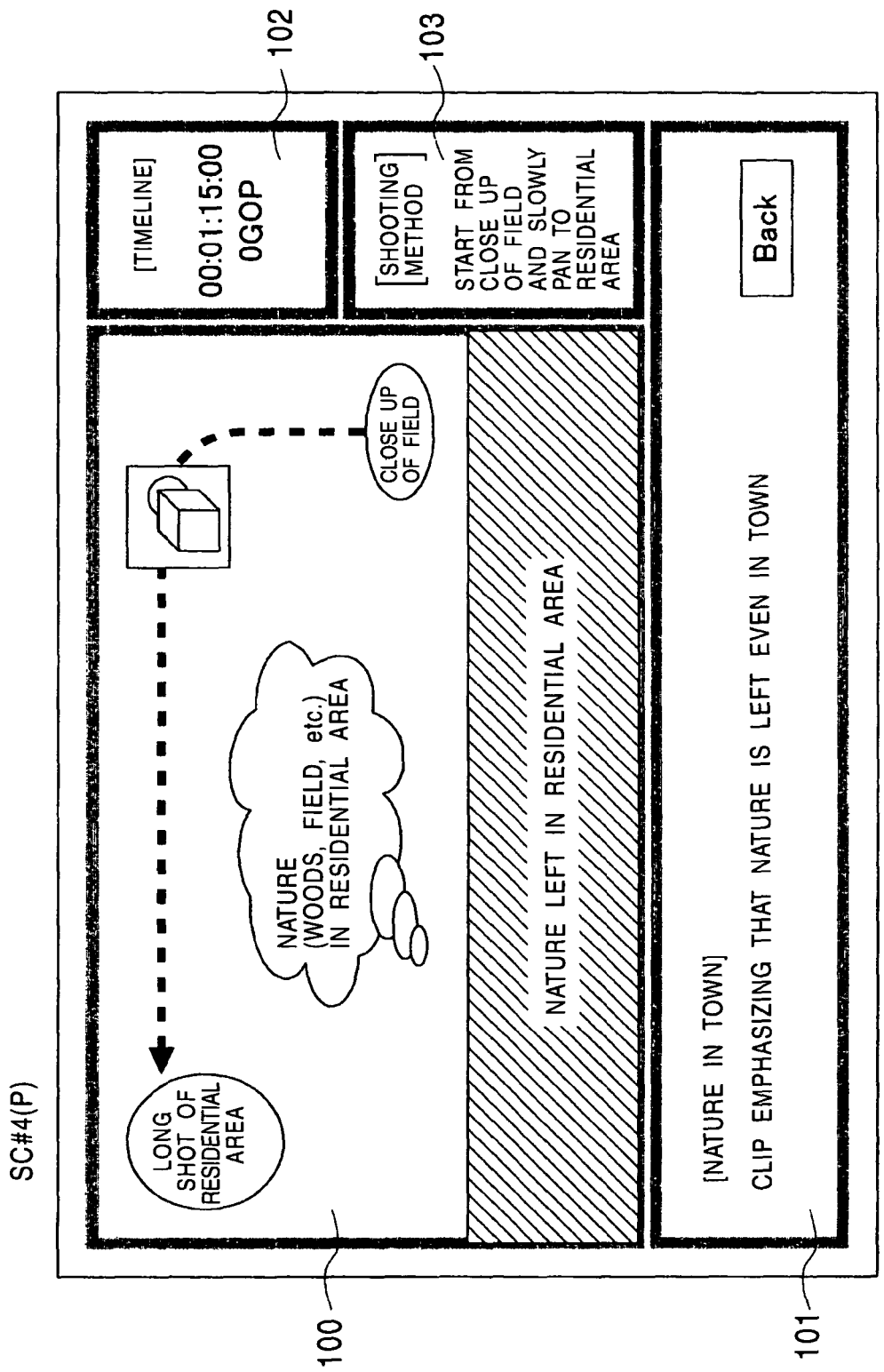
FIG. 12 is an illustration of an example of scene setting data of this embodiment.

FIG. 12 shows an example of the scene setting data SC#4 (P).

In this case, the video setting area 100 displays a video image in the form of text or a symbol. For example, the displayed video image conveys a scene to shoot to the video shooter who actually uses the video camera 1 to shoot images.

In the shooting method area 103, the shooting method, such as a zoom up or a pan, is written.

In the scene description area 101, the details of the scene are described.

In the timeline area 102, the time length of the scene assumed by the operator is indicated.

As described above, the project operator performs changes, editing, setting, and/or data selection for the scenes on the basis of the details of the scenes prepared in the template. Accordingly, the scene setting data SC#1(P), SC#2(P), . . . are generated.

When the current scene arrangement of the template lacks a sufficient number of scenes, a scene is added in step F107. For the added scene, the setting, such as that shown in FIG. 12, is done. In contrast, when the operator wants to delete a scene, the operator deletes the scene.

Of the created scene setting data SC#1(P), SC#2(P), . . . , some require the actual shooting by the video camera 1 at a subsequent time, and others do not (the details of video images set by the scene setting data can be used, unchanged, as completed content). For example, the above-described title image and the map image can be used without changing them. In order to use animation or a video image created by computer graphics as a scene that is part of completed content, the video data to be actually used is linked to the scene setting data.

In step F109, the template (the scene setting data, the audio setting file, and the image processing setting file, which are edited and set on the template) can be reviewed. This enables the operator to review the rendition of completed content while creating the content project by playing and reviewing the template multiple times on the basis of the scene arrangement sequence shown in FIG. 7A. Necessary corrections can be made in the step of preparing the content project.

The scene arrangement included in the template can be edited in step F107. Even when there is no template that perfectly matches the scene arrangement intended by the project operator, the scene arrangement that perfectly matches the project operator's intention can be realized using the content project data.

Since the screen setting and the background music setting for each scene can be implemented by selecting data from the material database, the screen setting and the background music setting are easy. If possible, the operator may create data on one's own. Accordingly, highly original data can be created.

Since the order of setting the scenes or the order of setting the audio or image processing is arbitrary selectable by the operator, the operator can design the project in desired order. For example, when background music is set in the first place, the time length of the corresponding scene can be set in accordance with the time length of the background music. Accordingly, the simplicity and efficiency of preparing the content project are improved.

2-4 Recording onto Disk

As described with reference to FIG. 1, the content project data created on the basis of the template in the above-described manner is recorded on the disk 90.

After the process shown in FIG. 6 is completed, the CPU 41 records the edited template at that time, that is, the content project data, on the disk 90 placed on the disk drive 51.

Figure 13:
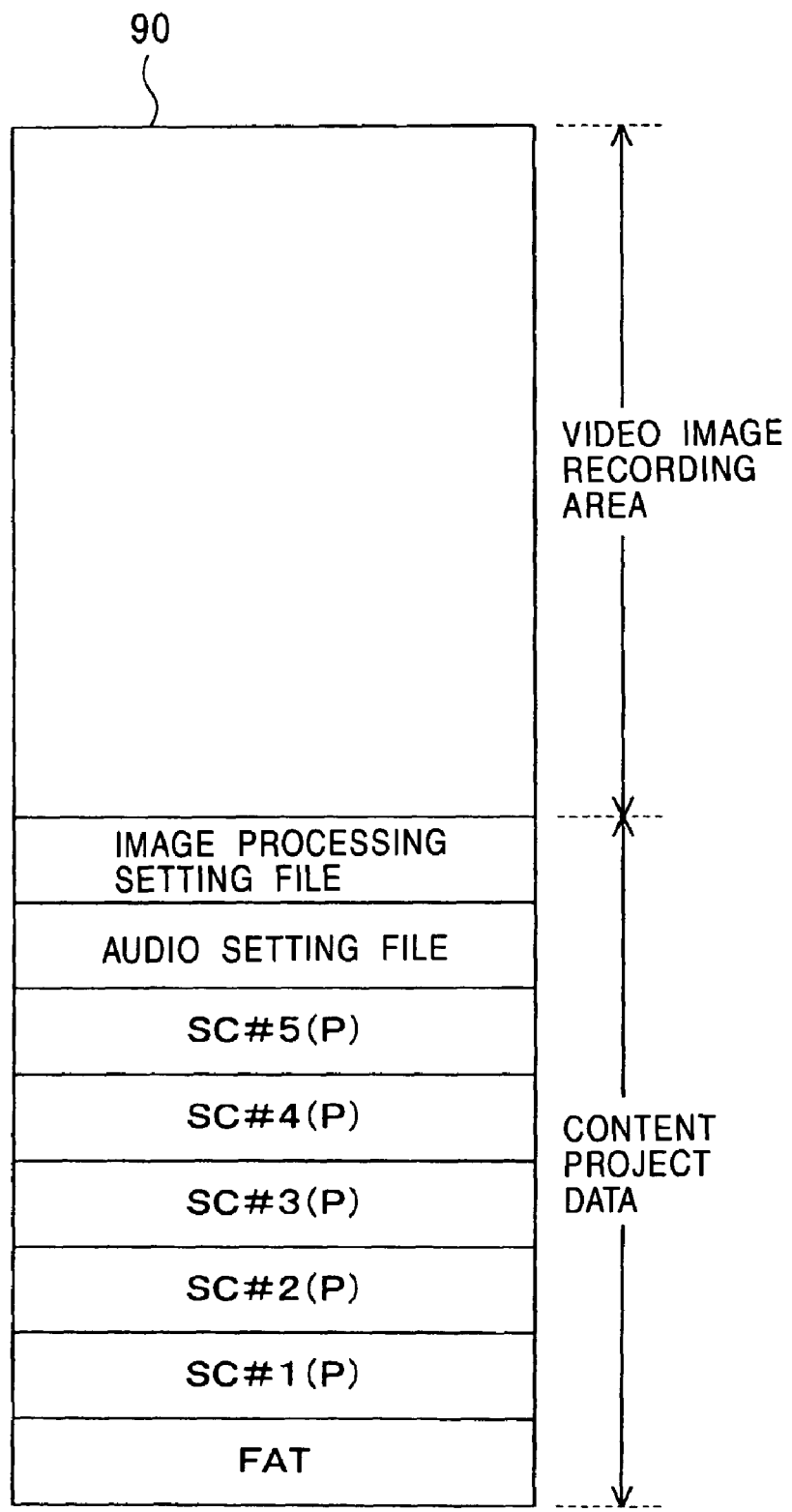
FIG. 13 is a diagram of a disk having recorded thereon the content project data of this embodiment.

FIG. 13 schematically shows the recording state of the disk 90.

As has been described earlier, the disk 90 is a medium for use by the video camera 1 in recording video image signals. A video image recording area is prepared in the disk 90, and content project data is recorded, as shown in FIG. 13.

When the content project data includes, for example, five scenes, the scene setting data SC#1(P) to SC#5(P) associated with the five scenes are recorded.

Each piece of the scene setting data SC#1(P) to SC#5(P) includes the displayed details illustrated in FIGS. 8A to FIG. 12 and actual video data linked thereto.

Also, the audio setting file is recorded. The audio setting file includes the audio setting and the actual music and voice data, such as those illustrated in FIGS. 7(b) and (c).

Also, the image processing setting file is recorded. The image processing setting file includes the details of the image processing setting, such as those shown in FIG. 7(d).

Each file serving as the content project data to be recorded on the disk 90 is managed by management information in FAT (File Allocation Table) format or the like. FAT enables the scene setting data SC#1(P), SC#2(P), . . . for the scenes to be played in accordance with the content sequence.

When playing the disk 90, preliminary content based on the content project data is read in accordance with the planned video sequence. Audio data, such as background music, can be played in synchronization with video data.

The management information need not be in the so-called FAT format.

FIG. 14(a) schematically shows the created content project data in accordance with the playback sequence.

At the time the content project data is created, the content project data is reviewed (played) by the content project creating apparatus shown in FIG. 2 or recorded on the disk 90 and played by the content project creating apparatus, the video camera 1, or another disk player. In such a case, as shown in FIG. 14(a), the details of the scene setting data SC#1(P), SC#2(P), . . . are played in accordance with the timeline, as in the case of completed content. Audio data including background music and narration is played on the basis of the audio setting file in synchronization with the scene sequence. The preset effects and characters to be superimposed are displayed on the basis of the image processing setting file.

In other words, the rendition of the content to be produced is checked over the same time length as that of the completed content.

3. Scene Shooting 3-1 Configuration of Video Camera

A process of shooting scenes (S2) shown in FIG. 1 will now be described. The video camera 1 used in scene shooting is described.

Figure 15:
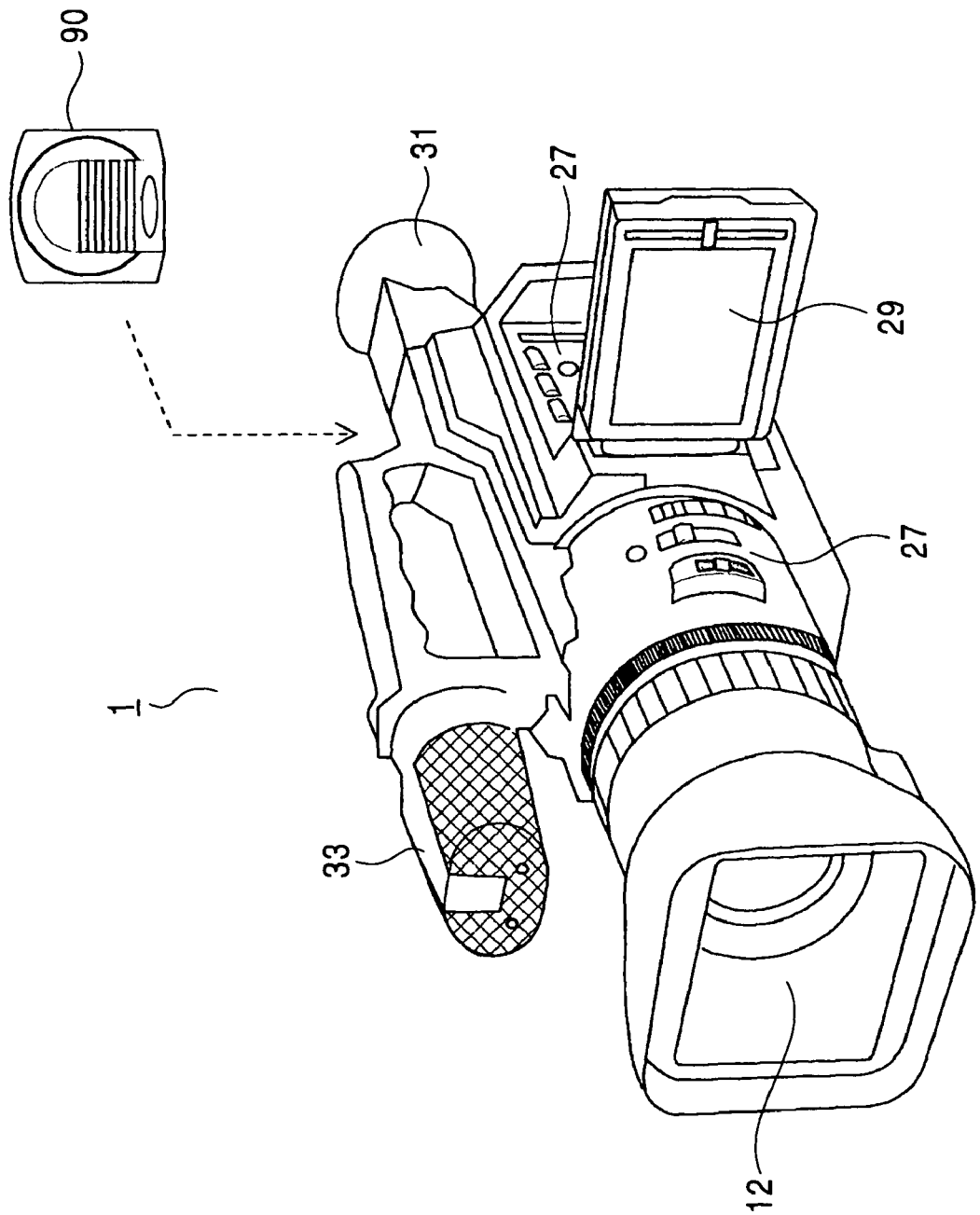
FIG. 15 is an illustration of the appearance of a video camera of this embodiment.

FIG. 15 shows an example of the appearance of the video camera 1.

A video shooter with the video camera 1 shoots images while looking into a viewfinder 31 or looking at an LCD 29.

Referring to FIG. 15, the video camera 1 includes a camera unit 12 for shooting images, a microphone 33 that collects sounds at the time of shooting, and a control panel 27 for performing various operations.

Although not shown in FIG. 15, for example, a disk drive on which the disk 90 is to be placed is disposed on the opposite side to the side on which the LCD 29 is disposed.

Figure 16:
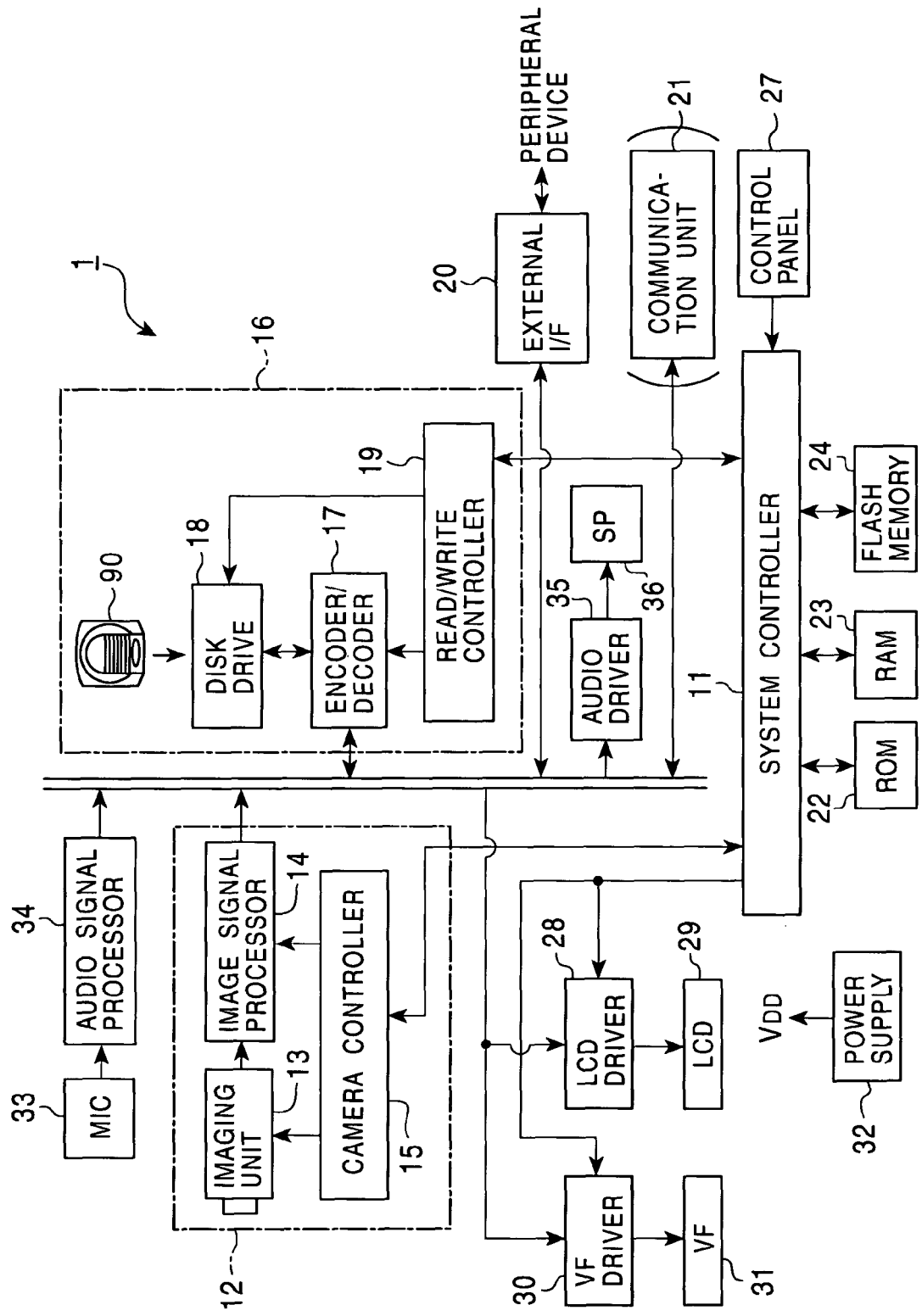
FIG. 16 is a block diagram of the video camera of this embodiment.

FIG. 16 shows the internal configuration of the video camera 1.

A system controller 11 includes a microcomputer and controls the overall video camera 1. In other words, the system controller 11 controls the operation of components described below.

The camera unit 12 is to capture video images and includes an imaging unit 13, an image signal processor 14, and a camera controller 15.

The imaging unit 13 includes a lens system including an imaging lens, a diaphragm, and the like; a drive system for causing the lens system to perform auto-focusing and zooming; a CCD (Charge Coupled Device) that detects imaging light obtained by the lens system and generates an image signal by performing photoelectric conversion; and the like.

The image signal processor 14 includes a sample-hold/AGC (Automatic Gain Control) circuit that adjusts the gain and shapes the waveform of a signal generated by CCD of the imaging unit 13 and a video A/D converter. The image signal processor 14 generates digital video data from the captured image data.

On the basis of an instruction from the system controller 11, the camera controller 15 controls the operation of the imaging unit 13 and the image signal processor 14. For example, the camera controller 15 controls the imaging unit 13 (motor control) to perform auto-focusing, auto-exposure control, diaphragm control, and zooming.

The camera controller 15 includes a timing generator. Using a timing signal generated by the timing generator, the camera controller 15 controls the signal processing operation of CCD and the sample-hold/AGC circuit and the video A/D converter of the image signal processor 14.

With this arrangement, the camera unit 12 generates video image data.

An audio signal obtained by the microphone 33 is A/D-converted by an audio signal processor 34 to generate audio data in synchronization with the video image data.

A read/write unit 16 writes the video image data generated by the camera unit 12 (and the audio data generated by the microphone 33) onto a recording medium and reads the data from the recording medium.

The read/write unit 16 includes an encoder/decoder 17, a disk drive 18, and a read/write controller 19.

At the time of shooting (image capturing), the encoder/decoder 17 compresses the video image data generated by the camera unit 12 into MPEG (Moving Picture Experts Group) format or another compression format or into a recording format of the disk 90. The encoder/decoder 17 compresses the audio data and converts the format of the audio data. Alternatively, the video image data and the audio data may be recorded on the disk 90 without being compressed.

The video image data (and the audio data) processed by the encoder/decoder 17 are supplied to the disk drive 18 and recorded on the placed disk 90.

When reading the data recorded on the disk 90, the video data (and the audio data) read by the disk drive 18 are decoded by the encoder/decoder 17.

On the basis of an instruction from the system controller 11, the read/write controller 19 controls the processing by the encoder/decoder 17, reading/writing by the disk drive 18, and data input/output.

By controlling the disk drive 18, the read/write controller 19 causes the disk drive 18 to read/write management information, such as FAT data, and to edit data recorded on the disk 90 in response to the updating of the FAT.

The video image data generated by the camera unit 12 at the time of shooting and the video data read from the disk 90 can be displayed on the viewfinder 31 and the LCD 29.

At the time of shooting or in shooting standby mode, when the camera unit 12 outputs the video image data, the video image data is supplied to both or either of a viewfinder driver 30 and an LCD driver 28.

In response to an instruction from the system controller 11, the viewfinder driver 30 and the LCD driver 28 cause the viewfinder 31 and the LCD 29, respectively, to display a video image based on the video image data. Also, the viewfinder driver 30 and the LCD driver 28 superimpose a character image in response to an instruction from the system controller 11.

At the time of reading the video data from the disk 90, the video data read and output by the disk drive 18 and decoded by the encoder/decoder 17 is supplied to both or either of the viewfinder driver 30 and the LCD driver 28. In response to an instruction from the system controller 11, the viewfinder driver 30 and the LCD driver 28 cause the viewfinder 31 and the LCD 29, respectively, to display a video image based on the supplied video data and a character image superimposed on the video image.

While looking at the viewfinder 31 and/or the LCD 29, a user of the video camera 1 performs monitoring in shooting standby mode (reviews a subject of shooting) or in shooting mode and checks and edits the details of video images recorded on the disk 90. The video data recorded on the disk 90 includes video data recorded to serve as the above-described content project data and video data captured and recorded by the video camera 1.

The audio data read from the disk 90 is D/A-converted by an audio driver 35, subjected to signal processing such as filtering and amplification, and output from a speaker 36.

An external interface 20 inputs and outputs video data, content project data, and the like to and from external devices including an audio/visual device, an information device, a storage device, and the like.

A communication unit 21 performs wired and wireless network communication. For example, the communication unit 21 includes a modem, an Ethernet interface, a cellular phone interface, and the like.

These components are not directly related to the shooting operation based on the content project data recorded on the disk 90. The content project data may not be recorded on the disk 90. In such a case, these components are used to input the content project data. These components will be described in modifications.

A ROM 22, a RAM 23, and a flash memory 24 are used as storage areas and arithmetic areas for data and programs required by the system controller 11.

For example, the ROM 22 stores a processing program by the system controller 11, fixed data, and the like. The RAM 23 is used as a storage or work area for temporarily storing information. The flash memory 24 stores various control coefficients.

The control panel 27 includes various control buttons (ON/OFF, shoot, play, zoom, various modes, and edit buttons) for user operation of the video camera 1.

In response to detection of user operation using the control button(s), the system controller 11 controls the components so that the necessary operation can be performed.

In a power supply 32, a DC/DC converter converts DC power obtained from a built-in battery or DC power generated from commercial AC power via a power adapter into power supply voltage at a predetermined level and supplies the power supply voltage to the circuits. Turning power ON and OFF by the power supply 32 is controlled by the system controller 11 in accordance with the power ON/OFF operation from the control panel 27.

Although the video camera 1 arranged as described above has the LCD 29, the video camera 1 need not have the LCD 29.

The details of images displayed on the LCD 29 at the time of scene shooting are described later. Alternatively, an external monitor device may be connected, and the external monitor device may be caused to display images as in the LCD 29.

3-2 Process of Shooting Scenes

Figure 17:
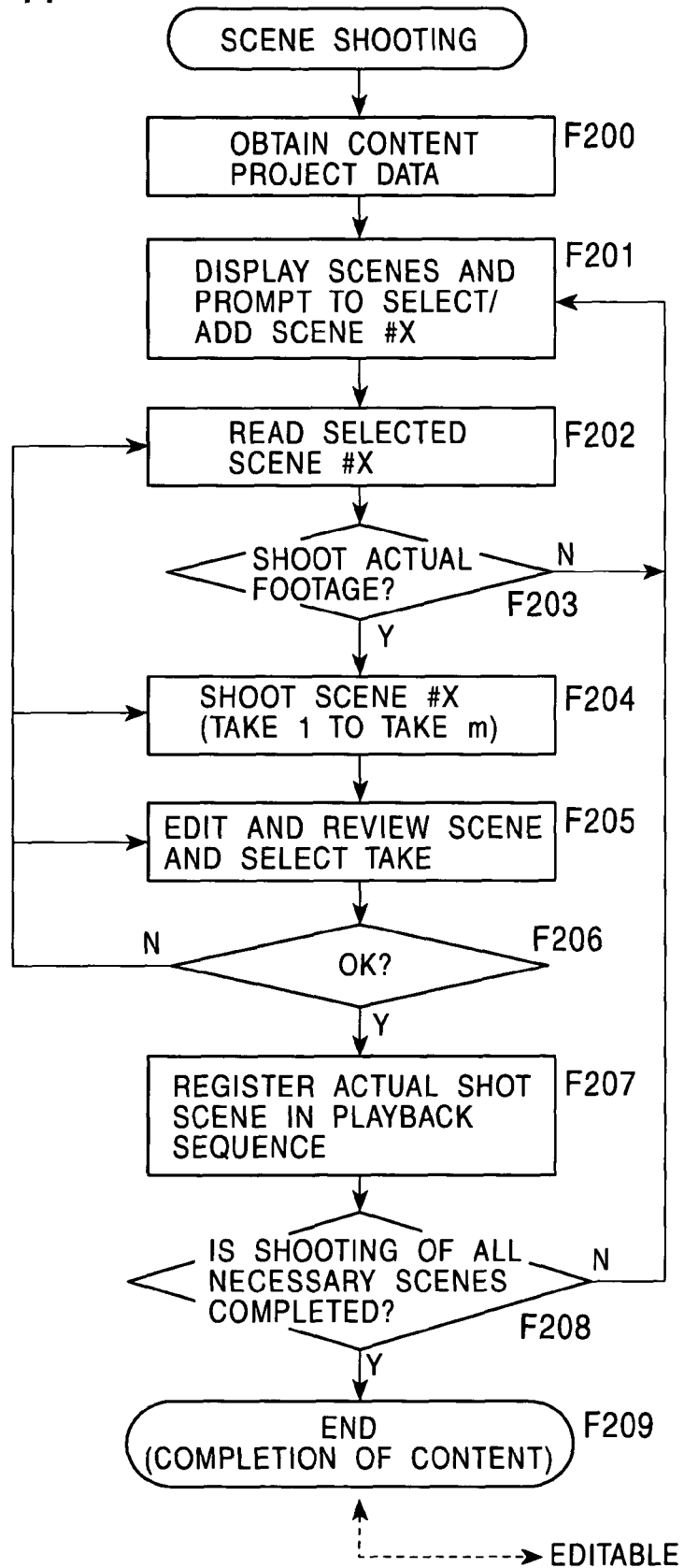
FIG. 17 is a flowchart showing a process of shooting scenes of this embodiment.

FIG. 17 shows a scene shooting process performed using the video camera 1. Specifically, FIG. 17 shows a process performed by the system controller 11 of the video camera 1 on the basis of operation by the operator.

In step F200, the system controller 11 obtains content project data. As in this example, when the disk 90 having recorded thereon the content project data is placed at the time of shooting, it is only necessary to detect that the content project data is recorded on the disk 90.

In step F201, the system controller 11 displays scenes included in the content project data and prompts the video shooter to select one of the scenes.

For example, the system controller 11 plays representative images of the scene setting data SC#1(P), SC#2(P), . . . and displays the representative images on the LCD 29.

FIG. 18(a) shows an example of displaying a scene selection screen. Referring to FIG. 18(a), for example, the screen is divided into portions, and the first image on the video setting area 100 of each of the scene setting data SC#1(P), SC#2(P), . . . is displayed in the corresponding portion. Specifically, the video images, which are set as shown in FIGS. 8B, 9B, 10B, and 11B, are displayed in the corresponding portions. In this example, four scenes are displayed. Images of the fifth scene setting data and onward are displayed by, for example, scrolling the screen.

The video shooter selects the scene on the scene selection screen. In response, in step F202, the system controller 11 reads scene setting data SC#x for selected scene #x.

When scene #4 is selected, the system controller 11 reads the scene setting data SC#4(P) from the disk 90 and displays the corresponding image on the LCD 29, as shown in FIG. 18(b).

Looking at the read image of the scene setting data SC#4(p), the video shooter checks the details to be shot in scene #4.

In other words, the video shooter checks the description of the scene, the video image, the timeline, and the shooting method.

When another scene is selected in step F201, the system controller 11 reads scene setting data associated with the selected scene.

As described above, scene setting data for, for example, the title scene does not need the actual shooting.

The video shooter looks at the read image of the scene setting data and determines whether to do shooting. If the scene requires shooting and the video shooter wants to immediately start the shooting, the video shooter performs an operation to execute the shooting in a state in which the scene is selected (scene is played).

Unless the video shooter performs an operation to give an instruction to start the shooting, the system controller 11 returns to step F201, and the scene selection screen is displayed again.

In a case in which the scene setting data SC#x(P) is selected by the video shooter and is read, when the video shooter performs an operation to start shooting the scene, the process proceeds to step F204 in which shooting is done.

When the video shooter performs an operation to start the shooting, the video image data generated by the camera unit 12 (and the audio data generated by the microphone 33) are recorded on the disk 90.

The system controller 11 controls the LCD 29 to display a video image being shot. Referring to FIG. 18(c), for example, using a subsidiary screen displaying technique based on Picture-in-Picture (PIP) or a screen dividing technique, the played video of the scene setting data SC#x(P) is displayed.

Referring to FIG. 18(b), for scene #4, a video image of landscape of "nature in the town" and the scene setting data SC#4(P) designating such a video image are displayed.

Shooting need be continued from the start operation to the end operation by the video shooter. Since the video shooter checks the time length of the scene on the basis of the read video image of the scene setting data, the video shooter may perform shooting for a period slightly longer than the time length of the scene.

Alternatively, the system controller 11 may detect timeline information set in the scene setting data. The system controller 11 may manage the shooting period and may automatically terminate the shooting.

Specifically, when the timeline in the scene setting data has a scene lasting one minute, the system controller 11 sets a shooting period of, for example, 1 minute and 10 seconds, which is slightly longer than one minute. Time-count starts at the time the shooting starting operation is performed by the video shooter to start shooting. After 1 minute and 10 seconds has passed, the shooting is terminated automatically. Accordingly, the video shooter need not pay special attention to the shooting period and may concentrate on the shooting operation, such as the state of the subject of shooting, and operations including a zoom and a pan.

The scene shooting in step F204 can be repeated. Specifically, the scene shooting is performed multiple times to generate take 1, take 2, . . . until the video shooter is satisfied with the shot.

In other words, after a particular scene is selected in step F201, every time the scene shooting is performed in step F204, video image data is managed and recorded as video image data for the selected scene. When the shooting is done multiple times while the same scene is selected, pieces of video image data are managed as take 1, take 2, . . . of the same scene.

Figure 20:
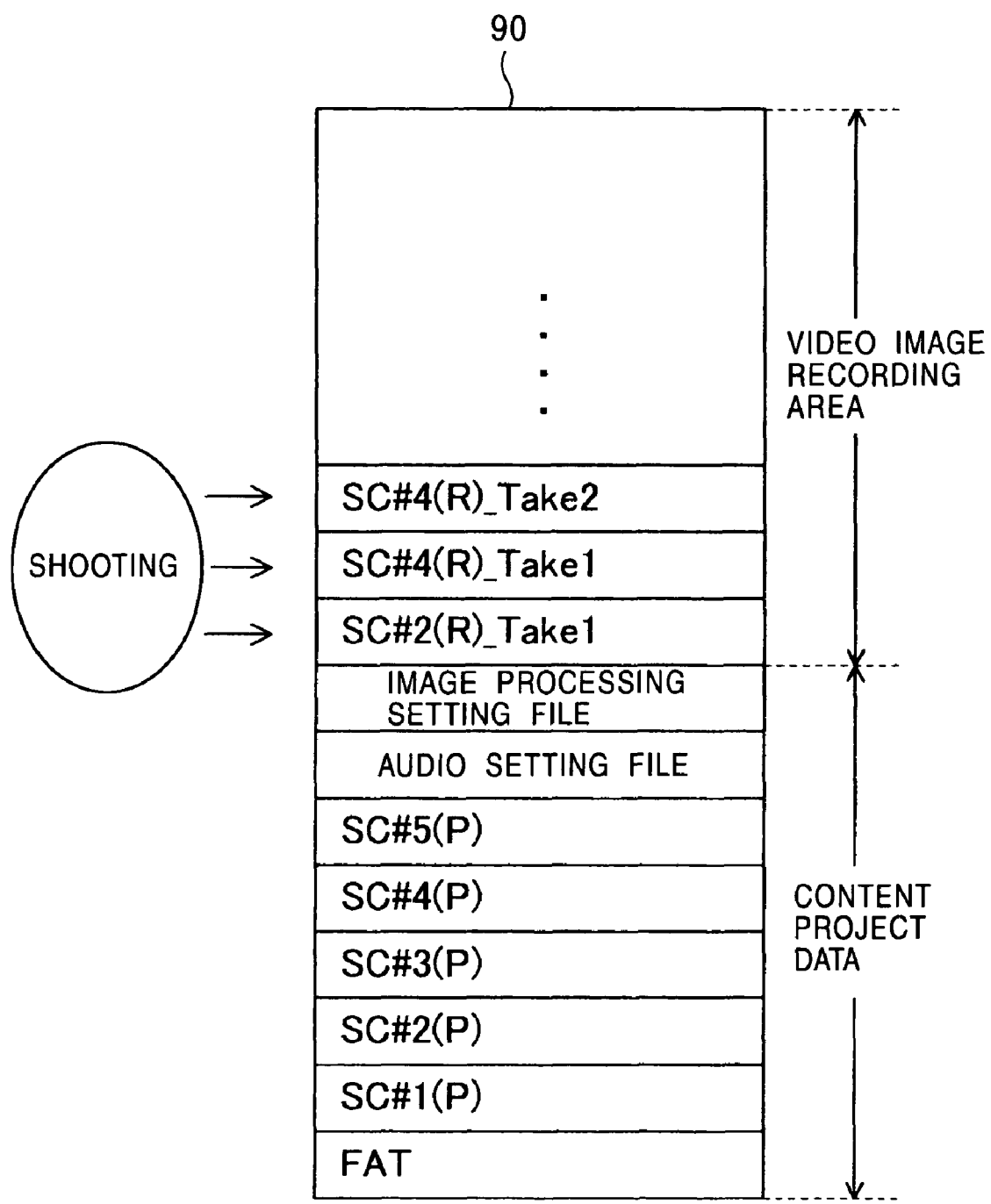
FIG. 20 is a diagram of the recording state of the disk after the scenes have been shot according to this embodiment.

FIG. 20 shows a state in which the video image data is recorded on the disk 90.

As has been described with reference to FIG. 13, while the content project data is recorded on the disk 90, the video image recording area is prepared in the disk 90. The video image data is recorded in the video image recording area. In this case, referring to FIG. 13, when scene #2 is selected and the scene shooting is done once, take 1 of video image data SC#2(R) for scene 2 is recorded. When scene #4 is selected and the scene shooting is done twice, take 1 and take 2 of video image data SC#4(R) for scene 4 are recorded.

Subsequent to the shooting in step F204, in step F205, the video image data for the scene is edited and reviewed, a take is selected, and the like.

Specifically, in accordance with an operation by the video shooter, the system controller 11 reads video image data SC#x(R) and displays an image for reviewing on the LCD 29. When a plurality of takes is produced, a take selection screen is displayed. The video image data is edited.

The video image data is mainly edited by marking the IN and OUT points in accordance with the preset period of each scene.

Figure 14:
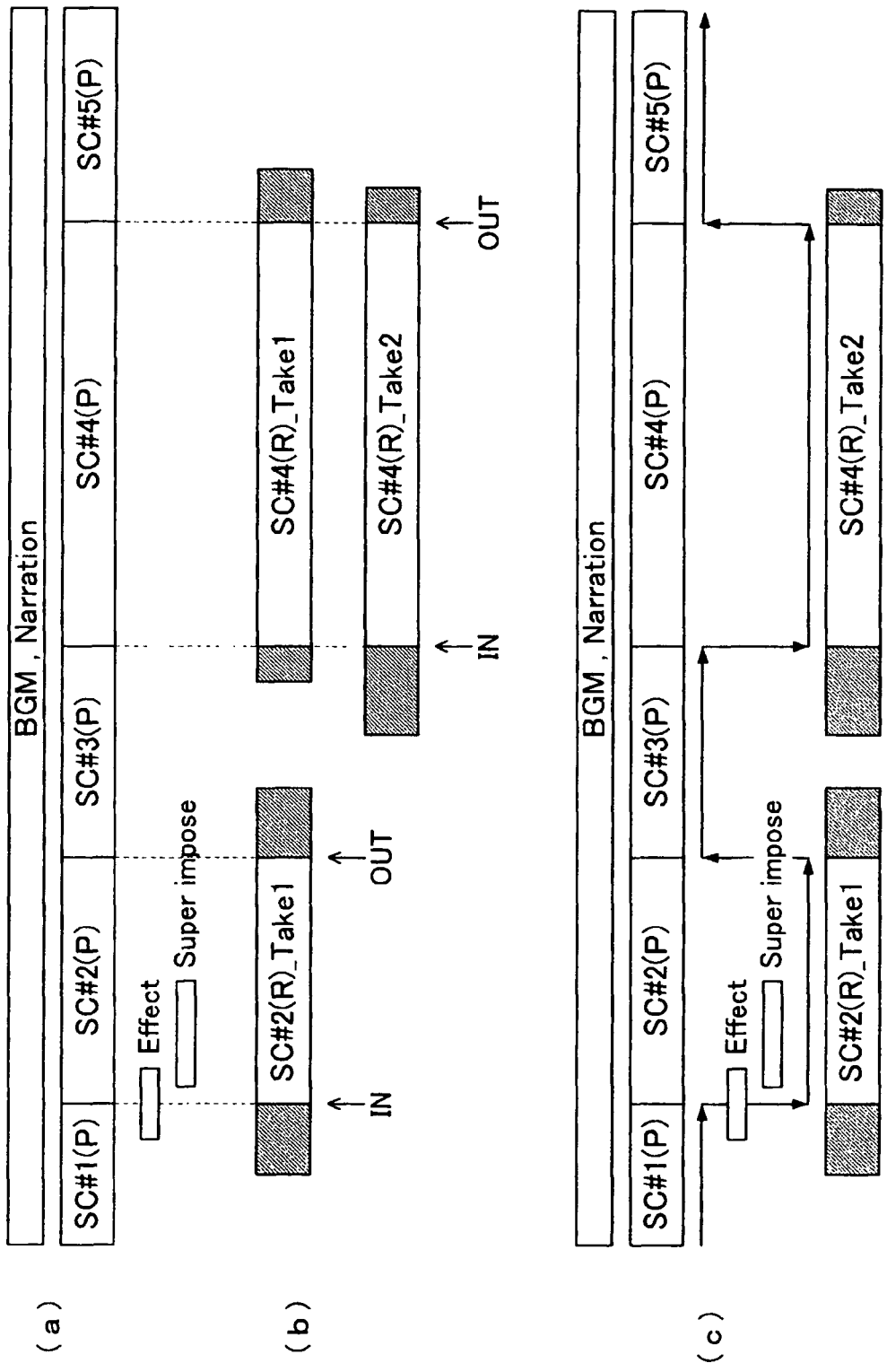
FIG. 14 includes diagrams of shooting based on the content project data of this embodiment and completed content.

For example, FIG. 14(*b*) shows take 1 of the video image data SC#2(R) and take 1 and take 2 of the video image data SC#4(R), which are shot while scenes #2 and #4 are selected. Each take lasts a period slightly longer than the preset period of the corresponding scene. In order to arrange these takes in the sequence of the content project data, these takes must be trimmed so as to match the preset time length in the scene setting data SC#2(P) and SC#4(P).

As shown in FIG. 14(*b*), the IN and OUT points are determined in accordance with operations by the video shooter.

For example, the video shooter determines the start point (IN point) while reviewing the video image data on the LCD 29. Subsequently, the system controller 11 calculates the OUT point on the basis of the preset time length and marks the OUT point.

The marked IN and OUT points are recorded in FAT. For example, the marked IN and OUT points of take 1 of the video image data SC#2(R) are registered in FAT as the start address and the end address of a file containing take 1 of the video image data SC#2(R).

The actual video data prior to the IN point and subsequent to the OUT point are not deleted from the disk 90. When the video shooter wants to change the IN and OUT points at a later time, the IN and OUT points can be changed.

When a plurality of takes is produced for a particular scene, the take selection processing is performed to select which take to use. For example, for scene #4, take 1 and take 2 are produced. Referring to FIG. 19(*a*), the system controller 11 reads pieces of video image data of take 1 and take 2 (take 1 and take 2 of SC#4(R)) and displays the read video data on the LCD 29.

While checking the read video data, the video shooter determines which take to use and selects the take. The system controller 11 maintains the take selection information.

In step F204, video image data generated by shooting an image(s) of a particular scene is recorded. In step F205, the video image data is reviewed and edited and a take is selected. When the video image data for the currently selected scene is confirmed, the process proceeds from step F206 to F207. In step F207, the selected take and the edited video image data at that time are registered so as to be imported into the sequence of the content project data.

Specifically, FAT is edited on the disk 90.

For example, at the time the content project data is prepared, FAT shown in FIG. 20 manages the content playback sequence using the scene setting data in the following order: SC#l(P), SC#2(P), SC#3(P), SC#4(P), and SC#5(P).

Subsequently, scene #4 is selected and shot, and take 1 and take 2 of video image data SC#4(R) are recorded. When take 2 is selected and confirmed, in step F207, FAT is updated, and the playback sequence is now managed in the following order: SC#1(P), SC#2(P), SC#3(P), SC#4(R) take 2, and SC#5(P).

In other words, the video image of scene #4 is changed by replacing the preset video image at the time the content project is drawn with the actually shot video image.

When the shooting of necessary scenes is not completed, the process returns from step F209 to F201. At this time, the system controller 11 displays the scenes in the sequence managed by FAT. After scene #4 has been replaced with the actual video image, the scene selection screen shown in FIG. 19(*b*) is displayed.

Figure 18:
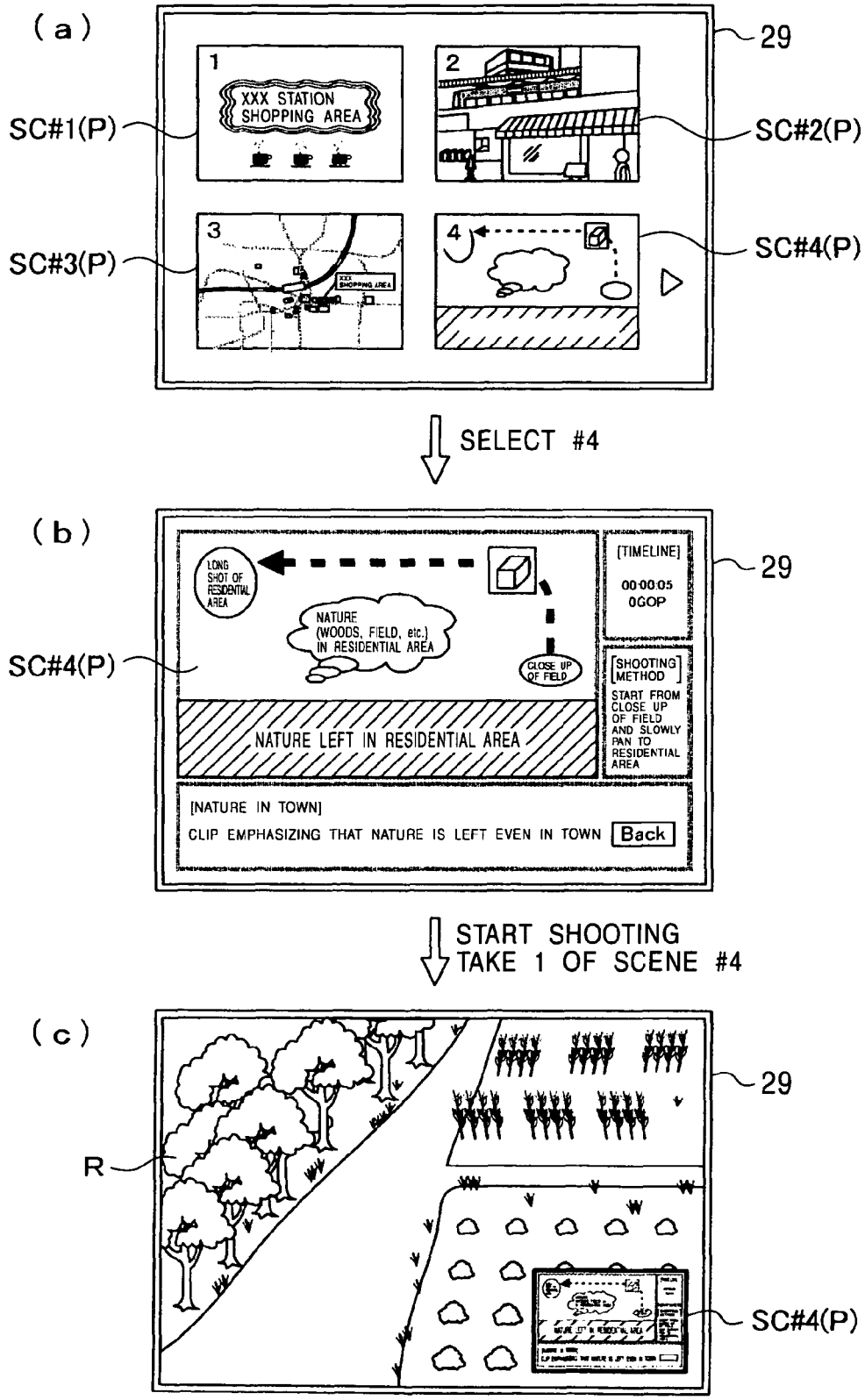
FIG. 18 includes illustrations of the operation from scene selection to shooting of this embodiment.

In other words, as is clear from the comparison with FIG. 18(*a*), the image corresponding to scene #4 is changed from the image of the scene setting data SC#4(P) to the image of take 2 of the video image data SC#4(R).

Subsequently, for example, in step F201, scene #2 is selected on the scene selection screen. In step F204, scene #2 is shot. In step F206, take 1 of video image data SC#2(R) is confirmed. In such a case, in step F207, FAT is updated, and take 1 of the video image data SC#2(R) is registered in the playback sequence. Specifically, the playback sequence is now managed in the following order: SC#1(P), SC#2(R) take 1, SC#3(P), SC#4(R) take 2, and SC#5(P). In other words, the video image of scene #2 is changed by replacing the preset video image at the time the content project is drawn with the actually shot video image.

The process in this state returns to step F201. Referring to FIG. 19(*c*), the image of take 1 of the video image data SC#2(R) is played as the image of scene #2.

When the video shooter does not confirm the take generated by shooting in step F204 and editing in step F205, the video shooter may control to return to one of steps F202, F204, and F205. In accordance with the operation by the video shooter, the system controller 11 repeats the processing.

While the shooting is done on location, the video shooter may come up with an idea and want to add a scene. In such a case, a scene can be added at the time the scene selection screen is displayed in step F201.

In response to an instruction by the video shooter to add a scene, the system controller 11 prepares a blank scene with no settings and adds the scene to the scene selection screen.

When the video shooter selects the added scene #y and controls to perform shooting, the system controller 11 performs shooting to generate video image data SC#y(R), which in turn is recorded on the disk 90. When the video image data SC#y(R) is confirmed in step F206, the system controller 11 updates FAT in step F207 so that the video image data SC#y (R) for the added scene is added to the playback sequence.

When the video shooter determines in step F208 that the necessary shooting is completed and performs a predetermined operation, the content is completed at this time.

For example, when the video shooter plans to shoot scenes #2 and #4 at the time the content project data is prepared, the shooting is completed at the time takes of scenes #2 and #4 are confirmed.

At this time, the playback sequence in the order "SC#1(P), SC#2(R) take 1, SC#3(P), SC#4(R) take 2, and SC#5(P)" is managed. When the overall content is played through from the disk 90, the playback shown in FIG. 14(*c*) is done. Specifically, in terms of the above-described content project data, the following scenes are played in sequence:

scene #1: title image set by the scene setting data SC#1;

scene #2: take 1 of the video image data SC#2(R) showing landscape of the station area;

scene #3: map image set by the scene setting data SC#3;

scene #4: take 2 of the video image data SC#(R) showing townscape; and scene #5: ending image set by the scene setting data SC#5.

Background music and narration are played in accordance with the audio setting file and in synchronization with the video. Visual effects are added and characters are superimposed in accordance with the image processing setting file.

Accordingly, the completed video content is produced.

Subsequently, as has been described with reference to FIG. 1, fine-tuning (S3) may be performed if necessary.

For example, the audio setting file may be modified to change the background music; the IN and OUT points for the video image data may be modified; and shooting of some of the scenes may be done again.

In other words, in this example, when production staff confirms the content-in-progress in the work process involving preparing the content project (S1), scene shooting (S2), and fine-tuning (S3), the content including the details recorded on the disk 90 and registered in the playback sequence is completed.

In the above-described process of shooting scenes, the video shooter carries on shooting while checking the scene setting data of the content project data. A proposal or a script with drawings is no longer required.

When the scene setting data SC#x(P) includes computer graphic images and video data from the material database, the video shooter can directly preview the video images intended at the time the content project is prepared. Therefore, shooting in accordance with the project is done easily.

By playing through the overall content in accordance with the playback sequence at an arbitrary time, the video shooter can check the overall flow and then does shooting. Also, the video shooter on location can check whether or not the transitions between the scenes are smooth. Accordingly, the video shooter accurately determines whether or not the video image data is satisfactory, and working efficiency is improved.

The order of shooting scenes is arbitrary. The video shooter may start with an easy-to-shoot scene.

In the case of content production according to this embodiment, even a non-expert video shooter can easily produce content of rather high quality since the content project data can be created easily and the video shooter can check the outline of the project and the shooting result by playing the content project data and the video image data in the sequence of the content at an arbitrary time.

4. Modifications

In the above-described embodiment, the content project data is recorded on the disk 90, and the disk 90 is used in the video camera 1 to perform shooting. In other words, placing the disk 90 into the video camera 1 enables the video camera 1 to obtain the content project data. Accordingly, the work starting from the design of a content project and ending with the completion of content is completed with one medium. This feature contributes to the improvement of efficiency and the simplicity of handling content.

In the case of producing, for example, travel guide content, when shooting is done at a place away from the office preparing the content project, or depending on the schedule of preparing the content project and the scene shooting, the transfer of the disk 90 may be difficult.

In order to solve this problem, the content project data may be transmitted to the video camera 1 via network communication or the like.

Specifically, the content project creating apparatus shown in FIG. 2 includes the communication processor 49 and the network interface 50, and the video camera 1 shown in FIG. 16 includes the communication unit 21. The content project creating apparatus and the video camera 1 can communicate data with each other. The content project creating apparatus transmits the content project data to the video camera 1.

The video camera 1 records the received content project data onto the disk 90. The video camera 1 is thus enabled to perform scene shooting, as described in the above embodiment.

Accordingly, shooting can be done at a remote place. When the video shooter wants to change the project after having started the scene shooting, new content project data can be transmitted easily. Therefore, content production efficiency is improved.

Alternatively, the content project data may be transferred by recording the content project data on a medium differing from that used by the video camera 1 for recording the video image data.

For example, the content project data is recorded on a memory card or on a disk medium differing from the disk 90.

When the video camera 1 includes a read/write unit corresponding to the memory card or the different disk medium, the video camera 1 reads the content project data, records the content project data on the disk 90, and performs the above-described scene shooting.

Even when the video camera 1 does not have a read/write unit corresponding to the memory card or the like, a read/write unit such as a memory card drive is connected via the external interface 20 to the video camera 1, thus enabling the video camera 1 to obtain the content project data.

The content project data and the video image data need not be recorded on the same medium. For example, even when the content project data and the video image data are recorded on different media, the above-described scene shooting can be performed as long as the recorded data on the media can be managed in association with each other.

As shown in FIGS. 15 and 16, the video camera 1 includes the LCD 29 to display various images, as descried above. Alternatively, an external monitor device may be connected to the video camera 1 to display images shown in FIGS. 18(a) to 19(c). In this sense, the LCD 29 need not be provided.

Alternatively, the viewfinder 31 may display images shown in FIGS. 18(a) to 19(c).

In the above example, the video camera 1 records the video image data on the disk 90 at the time of scene shooting. In addition to recording the video image data on the disk 90, the video camera 1 may transmit the video image data to the outside via the communication unit 21.

Figure 21:
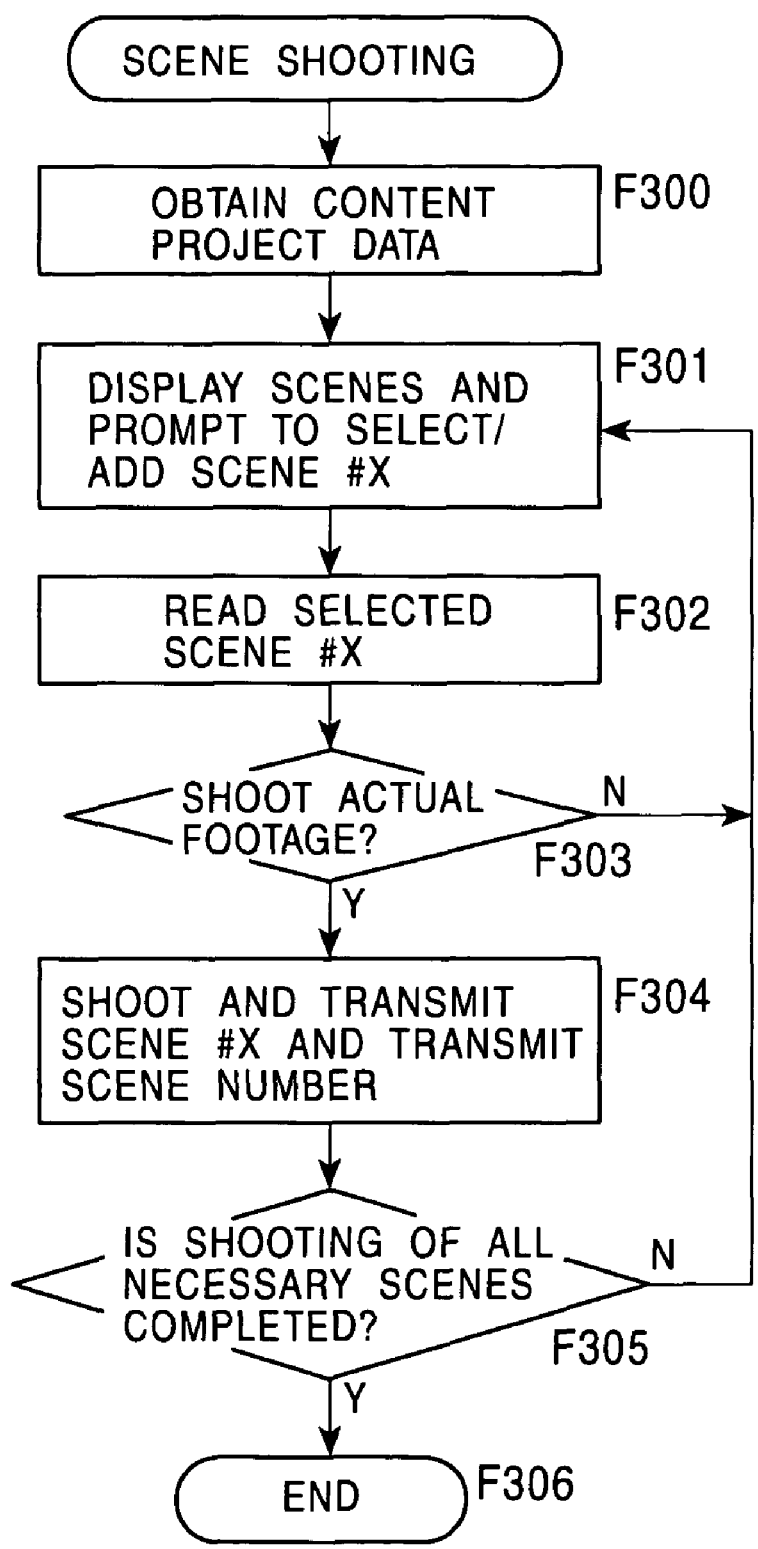
FIG. 21 is a flowchart showing another process of shooting scenes of this embodiment.
Figure 22:
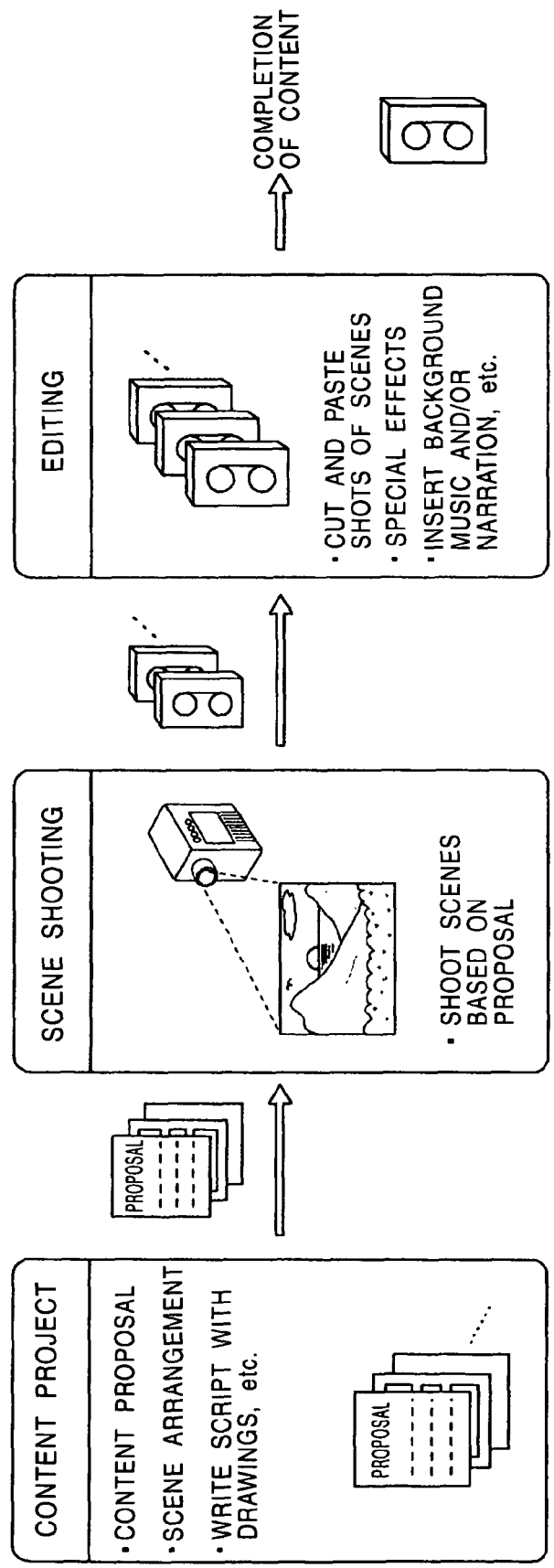
FIG. 22 is an illustration of a known content production process.

For example, a process of shooting scenes, which is shown in FIG. 21, is performed.

Steps F300, F301, F302, F303, and F305 shown in FIG. 21 are the same as steps F200, F201, F202, F203, and F208 shown in FIG. 17.

When it is determined in step F303 to actually shoot a selected scene #x, in step F304, the actually shot video image data is supplied to the communication unit 21, subjected to communication encoding, and transmitted to the outside.

At this time, the scene number (#x) serving as information on the selected scene and the identification information of the content project data are also transmitted.

Such shooting and transmission are performed while necessary scenes are selected. When the shooting of the necessary scenes is completed, the process proceeds from step F305 to F306, and the scene shooting is terminated.

Although the video image data is only transmitted in FIG. 21, the video image data may also be recorded on the disk 90.

The shooting in step F304 need be continued from the start operation to the end operation by the video shooter. Since the video shooter checks the time length of the scene on the basis of the read video image of the scene setting data, the video shooter may perform shooting for a period slightly longer than the time length of the scene.

Alternatively, the system controller 11 may detect timeline information set in the scene setting data. The system controller 11 may manage the shooting period and may automatically terminate the shooting.

The transmission destination of the video image data (and the scene number, etc.) is the content project creating apparatus or another information processing apparatus. In other words, the transmission destination can be any apparatus that at least contains a recording medium having recorded thereon the content project data.

The video image data transmitted from the video camera 1 is imported by the receiving information processing apparatus into the stored content project data. In other words, the receiving information processing apparatus records the video image data, which is received in association with the content project data, and the scene number.

On the basis of the scene number, the receiving information processing apparatus can rewrite the management information and import the video image data into the content project data. Also, the receiving information processing apparatus can store, select, and edit video image data of a plurality of takes of a particular scene.

In other words, the receiving information processing apparatus performs the processing in steps F205 and F207, which is performed by the video camera 1 in FIG. 17, since the receiving information processing apparatus stores the content project data, and the video image data is transmitted along with the scene number. Therefore, the receiving information processing apparatus can complete the content.

A readable/writable disk medium, such as a magneto-optical disk or a phase change disk, is suitable to be used as the disk 90 of the above-described embodiment. Alternatively, a different-format medium, such as a memory card using a flash memory, may be used in place of the disk 90. Any medium can be used that has sufficient capacity to record at least video data and that can be recorded, played, and edited.

The content project creating program according to the embodiment of the present invention is to realize a content project creating apparatus that performs the above-described content project preparation process using, for example, a personal computer. According to the content project creating program, the content project creating apparatus for achieving the above-described advantages is realized without using a special dedicated apparatus.

According to a program recording medium having recorded thereon such a content project creating program, the content project creating program is easily transferred.

A shooting program according to the embodiment of the present invention is to execute the above-described scene shooting process on the video camera 1 and serves as, for example, the program running on the system controller 11.

According to a program recording medium having recorded thereon such a shooting program, the shooting program is easily transferred. The program recording medium is thus suitable for designing and updating the version of the video camera 1.

The content project creating program and the shooting program according to the embodiment of the present invention may be recorded in advance on an HDD serving as a built-in recording medium in a device, such as a personal computer, a ROM included in a CPU, or the like.

Alternatively, the content project creating program and the shooting program may be stored (recorded) temporarily or permanently in a removable recording medium, such as a flexible disk, CD-ROM (Compact Disc Read Only Memory), MO (Magneto Optical) disk, DVD (Digital Versatile Disc), magnetic disk, or semiconductor memory. Such a removable recording medium can be provided as so-called packaged software.

The content project creating program and the shooting program may be installed from the removable recording medium into a personal computer or the like or may be downloaded from a download site via a network, such as a LAN (Local Area Network) or the Internet.

What is claimed is:

1. A content project creating method comprising the steps of:

selecting a template from a plurality of templates, each template containing a setting of a scene arrangement of a plurality of scenes of content;

producing scene setting data for a scene included in the edited template by setting details of the scene using existing material data or newly created data;

providing for recording video image data on a CD-format disk for each of a plurality of takes of a particular scene, said CD-format disk having a file allocation table;

displaying for selection on the video display of an image data recorder a piece of the video image data corresponding to each of the plurality of takes of the particular scene, the piece of the video image data for each of the plurality of takes of the particular scene being displayed simultaneously in the video display of the image data recorder;

selecting on the video display one of the displayed plurality of takes for the particular scene;

displaying in the video display of the image data recorder the selected take for each of the plurality of scenes, the selected takes being displayed in the scene arrangement of the selected template;

subsequently editing the scene setting data;

associating music data of a specified length of time with the particular scene; and outputting content project data constructed by managing the edited scene setting data on the basis of the scene arrangement set in the edited template, wherein the template is a scene arrangement sequence for the plurality of scenes set in advance for a story structure of the video content and prior to editing, wherein the specified length of time of the music data is automatically corrected when the period of the particular scene is changed.

2. The content project creating method according to claim 1, further comprising the step of setting details of audio in accordance with the scene arrangement set in the template or in association with each of the scenes.

3. The content project creating method according to claim 1, further comprising the step of setting details of image processing in accordance with the scene arrangement set in the template or in association with each of the scenes.

4. The content project creating method according to claim 1, further comprising the step of changing the scene arrangement set in the template.

5. The content project creating method according to claim 1, wherein, in the content project data outputting step, the content project data is read.

6. The content project creating method according to claim 1, wherein, in the content project data outputting step, the content project data is recorded on a recording medium.

7. The content project creating method according to claim 1, wherein, in the content project data outputting step, the content project data is transmitted.

8. The method of claim 1, comprising:
automatically terminating recording video image data for a particular one of the plurality of takes after a time period based on the timeline set in the template for the scene,
wherein the time period is slightly longer than the time period based on the timeline.

9. The method of claim 8, wherein the time period is approximately 10 seconds longer than the time period based on the timeline.

10. A non-transitory computer-readable medium storing a content project creating program for controlling an information processing apparatus, the program comprising the steps of:
selecting a template from a plurality of templates, each template containing a setting of a scene arrangement of a plurality of scenes of content;
producing scene setting data for a scene included in the edited template by setting details of the scene using existing material data or newly created data;
providing for recording video image data on a CD-format disk for each of a plurality of takes of a particular scene, said CD-format disk having a file allocation table;
displaying for selection on the video display of an image data recorder a piece of the video image data corresponding to each of the plurality of takes of the particular scene, the piece of the video image data for each of the plurality of takes of the particular scene being displayed simultaneously in the video display of the image data recorder;
selecting on the video display one of the displayed plurality of takes for the particular scene;
displaying in the video display of the image data recorder the selected take for each of the plurality of scenes, the selected takes being displayed in the scene arrangement of the selected template;
subsequently editing the scene setting data;
associating music data of a specified length of time with the particular scene; and
outputting content project data constructed by managing the edited scene setting data on the basis of the scene arrangement set in the edited template,
wherein the template is a scene arrangement sequence for the plurality of scenes set in advance for a story structure of the video content and prior to editing, and
wherein the specified length of time of the music data is automatically corrected when the period of the particular scene is changed.

11. The non-transitory computer-readable medium according to claim 10, the program further comprising the step of setting details of audio in accordance with the scene arrangement set in the template or in association with each of the scenes.

12. The non-transitory computer-readable medium according to claim 10, the program further comprising the step of setting details of image processing in accordance with the scene arrangement set in the template or in association with each of the scenes.

13. The non-transitory computer-readable medium according to claim 10, the program further comprising the step of changing the scene arrangement set in the template.

14. The non-transitory computer-readable medium according to claim 10, wherein, in the content project data outputting step, the content project data is read.

15. The non-transitory computer-readable medium according to claim 10, wherein, in the content project data outputting step, the content project data is recorded on a recording medium.

16. The non-transitory computer-readable medium according to claim 10, wherein, in the content project data outputting step, the content project data is transmitted.

17. An imaging apparatus comprising:
imaging means for capturing an image and generating a video image signal;
processing means for processing the video image signal;
obtaining means for obtaining content project data in the form of a template selected from a plurality of templates, each template including scene setting data for each scene included in a scene arrangement of a plurality of scenes of content;
recording means for recording video image data on a CD-format disk for each of a plurality of takes of a particular scene, said disk having a file allocation table;
displaying means for displaying the plurality of takes on the video display of the imaging means a piece of the video image data corresponding to each of the particular scene, the piece of the video image data for each of the plurality of takes of the particular scene being displayed simultaneously in the video display of the image data recorder;
selecting means for selecting on the video display one of the displayed plurality of takes for the particular scene;
means for associating music data of a specified length of time with the particular scene;
wherein the displaying means displays in the video display of the image data recorder the selected take for each of the plurality of scenes, the selected takes being displayed in the scene arrangement of the selected template;
editing means for subsequently editing the scene setting data;
display control means for displaying details of the content project data on a display device; and
imaging control means for controlling selection of a scene of the content project data, the capturing of the image by the imaging means, and the processing of the video image signal by the processing means,
wherein the template is a scene arrangement sequence for the plurality of scenes set in advance for a story structure of the video content and prior to editing, and
wherein the specified length of time of the music data is automatically corrected when the period of the particular scene is changed.

18. The imaging apparatus according to claim 17, wherein the processing means records the video image signal on a recording medium, and the imaging apparatus further comprises:
management information updating means for updating management information for the content project data so that the video image signal captured by the imaging means and recorded on the recording medium by the processing means while the scene of the content project data is selected is allocated to the scene arrangement of the content project data.

19. The imaging apparatus according to claim 18, wherein the obtaining means obtains the content project data recorded on the recording medium placed on the processing means.

20. The imaging apparatus according to claim 18, wherein the obtaining means obtains the content project data recorded on a recording medium differing from the recording medium placed on the processing means.

21. The imaging apparatus according to claim 18, wherein the display control means displays, on the display device, a video image that includes the video image signal allocated by the management information updating means to the scene arrangement of the content project data and that is based on the content project data.

22. The imaging apparatus according to claim 18, wherein the imaging control means sets the execution time for the imaging means to capture the image and for the processing means to record the video image signal on the recording medium while the scene of the content project data is selected on the basis of scene time information included in the content project data.

23. The imaging apparatus according to claim 18, further comprising editing means for editing the video image signal captured by the imaging means and recorded on the recording medium by the processing means while the scene of the content project data is selected.

24. The imaging apparatus according to claim 17, further comprising communication means for communicating with an outside, wherein the processing means transmits the video image signal from the communication means, and wherein the imaging control means transmits, upon transmission, from the communication means, of the video image signal captured by the imaging means while the scene of the content project data is selected, information on the selected scene.

25. The imaging apparatus according to claim 24, wherein the imaging control means sets the execution time for the imaging means to capture the image and for the processing means to transmit the video image signal from the communication means while the scene of the content project data is selected on the basis of scene time information included in the content project data.

26. The imaging apparatus according to claim 17, further comprising communication means for communicating with an outside, wherein the obtaining means obtains the content project data received by the communication means.

27. The imaging apparatus according to claim 17, wherein the display control means displays the scene setting data associated with the selected scene on the display device, the displayed scene setting data serving as the details of the content project data.

28. The imaging apparatus according to claim 17, wherein, upon capturing the image by the imaging means while the scene of the content project data is selected, the display control means displays, on the display device, the scene setting data associated with the selected scene and the video image signal generated by the imaging means.

29. The method of claim 17, comprising:
automatically terminating recording video image data for a particular one of the plurality of takes after a time period based on the timeline set in the template for the scene, wherein the time period is slightly longer than the time period based on the timeline.

30. The apparatus of claim 29, wherein the time period is approximately 10 seconds longer than the time period based on the timeline.

31. An imaging method comprising the steps of:
obtaining content project data in the form of a template selected from a plurality of templates, each template including scene setting data for each scene included in a scene arrangement of a plurality of scenes of content;
producing scene setting data for a scene included in the edited template by setting details of the scene using existing material data or newly created data;
providing for recording video image data on a CD-format disk for each of a plurality of takes of a particular scene, the disk having a file allocation table;
displaying for selection on the video display of an image data recorder a piece of the video image data corresponding to each of the plurality of takes of the particular scene, the piece of the video image data for each of the plurality of takes of the particular scene being displayed simultaneously in the video display of the image data recorder;
selecting on the video display one of the displayed plurality of takes for the particular scene;
associating music data of a specified length of time with the particular scene;
displaying in the video display of the image data recorder the selected take for each of the plurality of scenes, the selected takes being displayed in the scene arrangement of the selected template;
subsequently editing the scene setting data; and
displaying details of the edited content project data; and
capturing an image to generate a video image signal while selecting a scene of the content project data and processing the video image signal,
wherein the template is a scene arrangement sequence for the plurality of scenes set in advance for a story structure of the video content and prior to editing, and
wherein the specified length of time of the music data is automatically corrected when the period of the particular scene is changed.

32. The imaging method according to claim 31, wherein the processing of the video image signal is to record the video image signal on a recording medium, and management information for the content project data is updated so that the video image signal generated by capturing the image and recorded on the recording medium while the scene of the content project data is selected is allocated to the scene arrangement of the content project data.

33. The imaging method according to claim 32, wherein the content project data is recorded on the recording medium on which the video image signal is recorded, and the content project data is obtained from the recording medium.

34. The imaging method according to claim 32, wherein the content project data is recorded on a recording medium differing from the recording medium on which the video image signal is recorded, and the content project data is obtained from the different recording medium.

35. The imaging method according to claim 32, wherein a video image that includes the video image signal allocated to the scene arrangement of the content project data in response to updating the management information and that is based on the content project data is displayed.

36. The imaging method according to claim 32, wherein the execution time for capturing the image and for recording the video image signal on the recording medium while the scene of the content project data is selected is set on the basis of scene time information included in the content project data.

37. The imaging method according to claim 32, wherein the video image signal generated by capturing the image and recorded on the recording medium while the scene of the content project data is selected is editable.

38. The imaging method according to claim 31, wherein the processing of the video image signal is to transmit the video image signal, and upon transmission of the video image signal generated by capturing the image while the scene of the content project data is selected, information on the selected scene is transmitted.

39. The imaging method according to claim 38, wherein the execution time for capturing the image and for transmitting the video image signal while the scene of the content project data is selected is set on the basis of scene time information included in the content project data.

40. The imaging method according to claim 31, wherein the content project data is obtained by receiving the content project data in data communication.

41. The imaging method according to claim 31, wherein, upon displaying the details of the content project data, the scene setting data associated with the selected scene is displayed.

42. The imaging method according to claim 31, wherein, upon capturing the image while the scene of the content project data is selected, the scene setting data associated with the selected scene and the video image signal generated by capturing the image are displayed.

43. A non-transitory computer-readable medium storing an imaging program for controlling an imaging apparatus, the program comprising the steps of:
  obtaining content project data in the form of a template selected from a plurality of templates, each template including scene setting data for each scene included in a scene arrangement of a plurality of scenes of content;
  providing for recording video image data on a CD-format disk for each of a plurality of takes of a particular scene, said disk having a file allocation table;
  displaying for selection on the video display of the imaging apparatus a piece of the video image data corresponding to each of the plurality of takes of the particular scene, the piece of the video image data for each of the plurality of takes of the particular scene being displayed simultaneously in the video display of the image data recorder;
  selecting on the video display one of the displayed plurality of takes for the particular scene;
  associating music data of a specified length of time with the particular scene;
  displaying in the video display of the image data recorder the selected take for each of the plurality of scenes, the selected takes being displayed in the scene arrangement of the selected template;
  subsequently editing the content project data;
  displaying details of the edited content project data; and
  capturing an image to generate a video image signal while selecting a scene of the content project data and processing the video image signal,
  wherein the template is a scene arrangement sequence for the plurality of scenes set in advance for a story structure of the video content and prior to editing, and
  wherein the specified length of time of the music data is automatically corrected when the period of the particular scene is changed.

44. The non-transitory computer-readable medium according to claim 43, wherein the processing of the video image signal is to record the video image signal on a recording medium, and management information for the content project data is updated so that the video image signal generated by capturing the image and recorded on the recording medium while the scene of the content project data is selected is allocated to the scene arrangement of the content project data.

45. The non-transitory computer-readable medium according to claim 44, wherein the content project data is recorded on the recording medium on which the video image signal is recorded, and the content project data is obtained from the recording medium.

46. The non-transitory computer-readable medium according to claim 44, wherein the content project data is recorded on a recording medium differing from the recording medium on which the video image signal is recorded, and the content project data is obtained from the different recording medium.

47. The non-transitory computer-readable medium according to claim 44, wherein a video image that includes the video image signal allocated to the scene arrangement of the content project data in response to updating the management information and that is based on the content project data is displayed.

48. The non-transitory computer-readable medium according to claim 44, wherein the execution time for capturing the image and for recording the video image signal on the recording medium while the scene of the content project data is selected is set on the basis of scene time information included in the content project data.

49. The non-transitory computer-readable medium according to claim 44, wherein the video image signal generated by capturing the image and recorded on the recording medium while the scene of the content project data is selected is edited.

50. The non-transitory computer-readable medium according to claim 43, wherein the processing of the video image signal is to transmit the video image signal, and upon transmission of the video image signal generated by capturing the image while the scene of the content project data is selected, information on the selected scene is transmitted.

51. The non-transitory computer-readable medium according to claim 50, wherein the execution time for capturing the image and for transmitting the video image signal while the scene of the content project data is selected is set on the basis of scene time information included in the content project data.

52. The non-transitory computer-readable medium according to claim 43, wherein the content project data is obtained by receiving the content project data in data communication.

53. The non-transitory computer-readable medium according to claim 43, wherein, upon displaying the details of the content project data, the scene setting data associated with the selected scene is displayed.

54. The non-transitory computer-readable medium according to claim 43, wherein, upon capturing the image while the scene of the content project data is selected, the scene setting data associated with the selected scene and the video image signal generated by capturing the image are displayed.

55. A content creating system comprising:
  storage means for storing a template selected from a plurality of templates, each template containing a setting of a scene arrangement of a plurality of scenes of content and material data;
  selecting means for selecting the template stored in the storage means;
  producing scene setting data for a scene included in the edited template by setting details of the scene using existing material data or newly created data;
  scene details setting means for producing scene setting data for a scene included in the edited template by setting details of the scene using the material data obtained from the storage means or newly created data;
  recording means for recording video image data on a CD-format disk for each of a plurality of takes of a particular scene, the disk having a file allocation table;
  displaying means for displaying on the video display of the recording means a piece of the video image data corresponding to each of the plurality of takes of the particular scene, the piece of the video image data for each of the plurality of takes of the particular scene being displayed simultaneously in the video display of the image data recorder;
  selecting means for selecting on the video display one of the displayed plurality of takes for the particular scene;
  associating music data of a specified length of time with the particular scene;
  wherein the displaying means displays in the video display of the image data recorder the selected take for each of the plurality of scenes, the selected takes being displayed in the scene arrangement of the selected template;

content project data outputting means for outputting content project data constructed by managing the scene setting data on the basis of the scene arrangement set in the edited template;

imaging means for capturing an image and generating a video image signal;

processing means for processing the video image signal;

obtaining means for obtaining the content project data output by the content project data outputting means;

editing means for subsequently editing the content project data;

display control means for displaying details of the edited content project data on a display device; and imaging control means for controlling selection of a scene of the content project data, the capturing of the image by the imaging means, and the processing of the video image signal by the processing means, wherein the template is a scene arrangement sequence for the plurality of scenes set in advance for a story structure of the video content and prior to editing; and wherein the specified length of time of the music data is automatically corrected when the period of the particular scene is changed.

56. The content creating system according to claim 55, wherein the processing means records the video image signal on a recording medium, and the content creating system further comprises:

management information updating means for updating management information for the content project data so that the video image signal captured by the imaging means and recorded on the recording medium by the processing means while the scene of the content project data is selected is allocated to the scene arrangement of the content project data.

57. The content creating system according to claim 55, further comprising communication means for communicating with an outside, wherein the processing means transmits the video image signal from the communication means, and wherein the imaging control means transmits, upon transmission, from the communication means, of the video image signal captured by the imaging means while the scene of the content project data is selected, information on the selected scene.

* * * * *